US008204444B2

(12) United States Patent
Rajkotia et al.

(10) Patent No.: US 8,204,444 B2
(45) Date of Patent: Jun. 19, 2012

(54) ADJUSTABLE TRANSMISSION FILTER RESPONSIVE TO INTERNAL SADIO STATUS

(75) Inventors: Amol Rajkotia, San Diego, CA (US); Samir S. Soliman, San Diego, CA (US); Stanley S. Toncich, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 596 days.

(21) Appl. No.: 12/365,477

(22) Filed: Feb. 4, 2009

(65) Prior Publication Data

US 2010/0197249 A1    Aug. 5, 2010

(51) Int. Cl.
    *H04B 1/00*    (2006.01)
(52) U.S. Cl. .................. 455/63.1; 455/114.2; 455/120
(58) Field of Classification Search ............ 455/63.1, 455/114.2, 120
    See application file for complete search history.

(56) References Cited

U.S. PATENT DOCUMENTS

| | | | |
|---|---|---|---|
| 5,831,545 A | 11/1998 | Murray et al. | |
| 6,937,877 B2 | 8/2005 | Davenport | |
| 7,123,676 B2 * | 10/2006 | Gebara et al. | 375/364 |
| 7,236,756 B2 | 6/2007 | McGinn | |
| 7,460,831 B2 * | 12/2008 | Hasarchi | 455/15 |
| 7,525,481 B2 * | 4/2009 | Leinonen et al. | 342/357.59 |
| 7,706,307 B2 * | 4/2010 | Martinez | 370/276 |
| 7,729,431 B2 * | 6/2010 | Gebara et al. | 375/259 |
| 7,991,364 B2 * | 8/2011 | Rousu et al. | 455/78 |
| 2002/0184653 A1 | 12/2002 | Pierce et al. | |
| 2003/0078037 A1 | 4/2003 | Auckland et al. | |
| 2003/0087622 A1 | 5/2003 | Jayaraman et al. | |
| 2004/0014438 A1 * | 1/2004 | Hasarchi | 455/119 |
| 2004/0116091 A1 | 6/2004 | McGinn | |
| 2006/0019604 A1 * | 1/2006 | Hasarchi | 455/15 |
| 2006/0098723 A1 | 5/2006 | Toncich et al. | |
| 2006/0205346 A1 | 9/2006 | Evans et al. | |
| 2008/0119148 A1 * | 5/2008 | Ray | 455/150.1 |
| 2008/0171520 A1 * | 7/2008 | Steer | 455/77 |

(Continued)

FOREIGN PATENT DOCUMENTS

EP    0964514 A1    12/1999

(Continued)

OTHER PUBLICATIONS

International Search Report and Written Opinion—PCT/US2010/023223, International Search Authority—European Patent Office—Jul. 9, 2010.

(Continued)

*Primary Examiner* — Kenneth B. Wells
(74) *Attorney, Agent, or Firm* — Eric Ho

(57) ABSTRACT

An adjustable filter is responsive to a control signal to change a frequency response of the adjustable filter based on at least one of a geographic location, frequency spectrum information, and a status of a secondary internal radio. The control signal may shift a center of the pass band from a first center frequency to a second center frequency and/or change a pass band bandwidth from a first bandwidth to a second bandwidth. A transmitter includes an adjustable filter responsive to a control signal and controller configured to select a frequency response of the adjustable filter by generating the control signal based on a geographical location. In one aspect, the geographical location indicates a region of operation of the receiver and the frequency response is selected in accordance with the region.

38 Claims, 12 Drawing Sheets

U.S. PATENT DOCUMENTS

| | | |
|---|---|---|
| 2008/0171527 A1 | 7/2008 | Masoian |
| 2008/0214134 A1 | 9/2008 | Shi et al. |
| 2008/0226002 A1 | 9/2008 | Bobier |
| 2010/0118921 A1 | 5/2010 | Abdelmonem et al. |

FOREIGN PATENT DOCUMENTS

| | | |
|---|---|---|
| EP | 1037482 A2 | 9/2000 |
| EP | 1139574 A2 | 10/2001 |
| EP | 1233508 A2 | 8/2002 |
| EP | 1379003 | 1/2004 |
| EP | 1424813 A2 | 6/2004 |
| EP | 1760893 | 3/2007 |
| EP | 1924002 A1 | 5/2008 |
| WO | WO0039936 | 7/2000 |
| WO | WO03017706 | 2/2003 |
| WO | WO2006052766 A1 | 5/2006 |

OTHER PUBLICATIONS

EETime magazine: Self-adaptive RF digital signal processing enables wireless network spectral efficiency, Sean Cordone, ISCO International May 10, 2011 8:16 AM EDT.

* cited by examiner

ADJUSTABLE TRANSMISSION FILTER RESPONSIVE TO INTERNAL SADIO STATUS

REFERENCE TO CO-PENDING APPLICATIONS FOR PATENT

The present Application for Patent is related to the following co-pending U.S. Patent Applications:

"ADJUSTABLE TRANSMISSION FILTER" having Ser. No. 12/365,450, filed concurrently herewith on Feb. 4, 2009, assigned to the assignee hereof, and expressly incorporated by reference herein; and "ADJUSTABLE RECEIVE FILTER RESPONSIVE TO FREQUENCY SPECTRUM INFORMATION" having Ser. No. 12/365,500, filed concurrently herewith on Feb. 4, 2009, assigned to the assignee hereof, and expressly incorporated by reference herein.0

BACKGROUND

1. Field

The present application relates generally to communication, and more specifically to filters.

2. Background

Wireless communication devices typically must transmit and receive signals in accordance with regulatory requirements that may vary between geographical regions. As a result, wireless communication devices must either be specifically manufactured for a particular region or must be able to operate in accordance with the regulatory requirements of multiple regions. Receivers and transmitters include signal filters for attenuating unwanted signals and noise. Transmitters within wireless communication devices typically include a transmission filter for filtering output going transmissions to minimize the amplitude of undesired signals while passing the desired signals. The transmission filter, therefore, should minimize attenuation of signals of the transmission band and maximize attenuation of signals outside the transmission band. In addition to transmission filters near the antenna, transmitters may include other interstage filters within the transmission lineup. Regulatory requirements often dictate the characteristics of the transmission filters due to the differences in the location and size of the frequency bands and the differences in restrictions in the location and authorized energy of transmitted signals and spurious emissions near or within the authorized frequency band. Conventional wireless communication devices either include a transmission filter that meets the requirements of a specific region or include multiple transmission filters. These conventional techniques are limited in that some devices may only operate in certain regions and that they result in increased manufacturing cost.

In addition, the operating environment changes as the device moves to different regions or to different locations within a region. In a sparsely populated location, interference and noise created by nearby devices may be minimal to a communication device. A filter with a frequency response that allows more energy to enter may be advantageous. When the communication device is exposed to a location with more devices and noise, it may be advantageous to utilize filters with narrower pass bands or with different center frequencies as compared to the filters used in a low noise environment. Conventional devices are limited in that either the devices are implemented with multiple filters or are implemented with filters that are not optimum for certain spectral conditions.

Therefore, there is need for a communication device with an adjustable filter.

SUMMARY

An adjustable filter is responsive to a control signal to change a frequency response of the adjustable filter based on at least one of a geographic location, frequency spectrum information, and a status of a secondary internal radio. The control signal may shift a center of the pass band from a first center frequency to a second center frequency and/or change a pass band bandwidth from a first bandwidth to a second bandwidth. A transmitter includes an adjustable filter responsive to a control signal and controller configured to select a frequency response of the adjustable filter by generating the control signal based on a geographical location. In one aspect, the geographical location indicates a region of operation of the receiver and the frequency response is selected in accordance with the region.

DETAILED DESCRIPTION

Figure 1A:
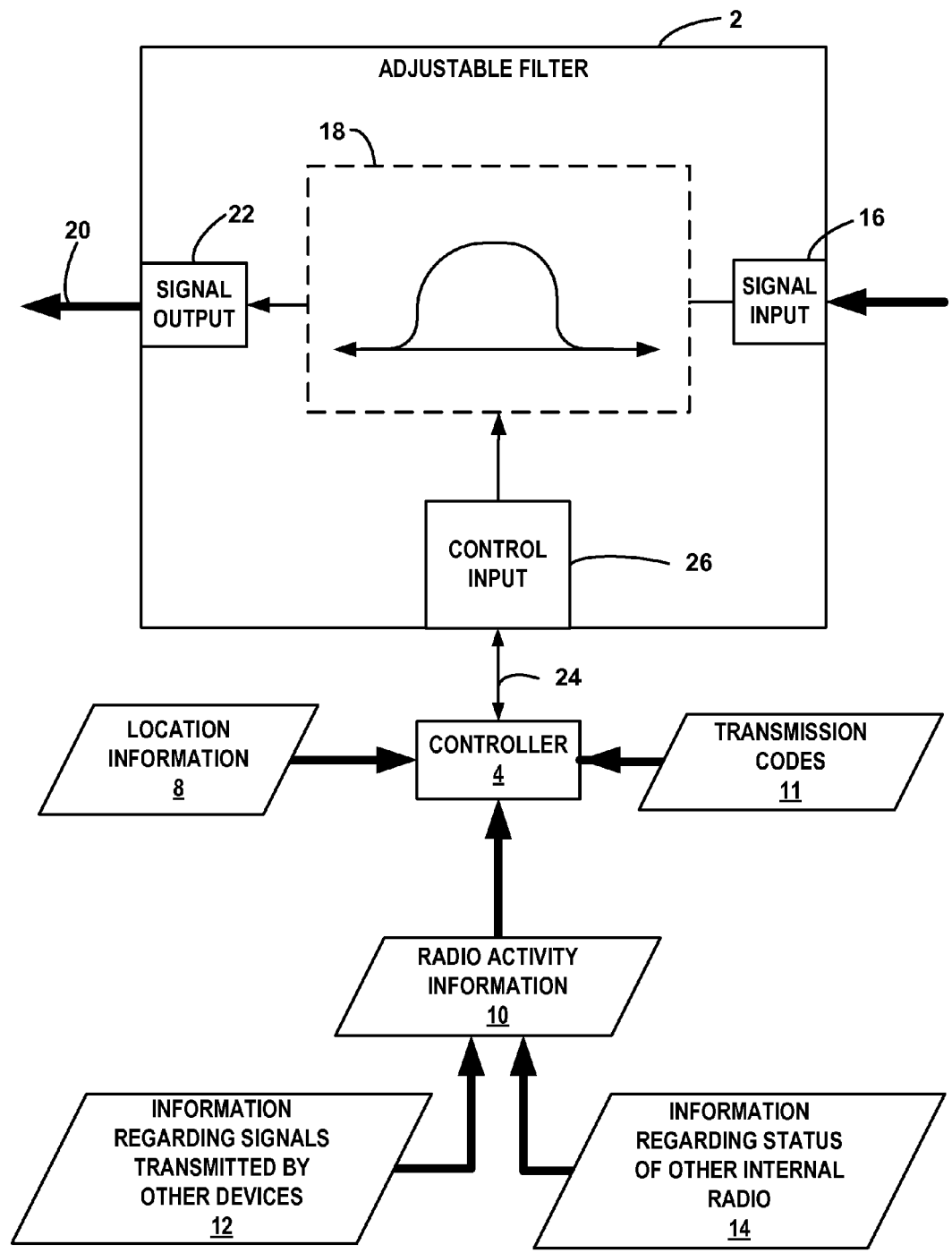
FIG. 1A is block diagram of an adjustable filter and a controller.

The word "exemplary" is used herein to mean "serving as an example, instance, or illustration." Any embodiment or aspect described herein as "exemplary" is not necessarily to be construed as preferred or advantageous over other embodiments or aspects. In addition, references to "an," "one," "other," or "various" embodiments or aspects should not be construed as limiting since various aspects of the disclosed embodiments may be used interchangeably within other embodiments.

The filter devices and methods described below can be used in any device, apparatus, or system that could benefit from signal filtering, including, for example, channelized receivers, mobile/cellular telephones, multi-band radios and/or transceivers (e.g., wired or wireless), and base stations that may be part of a wireless communication system. As used herein, the term "filter" may be used to describe a device through which a signal may be passed in order to remove unwanted components of the signal, which may include, for example, component at certain frequencies, noise, and interference. The filter has a frequency response that may be characterized by a pass band and a stop band where signals within the pass band are attenuated less than signals that are attenuated within the stop band.

The term "adjustable filter" is used herein to describe a filter that has a frequency response that can be adjusted with a control signal. An "adjustable receive band filter" refers to an adjustable filter that may be used to filter an incoming signal and/or a previously received signal. An "adjustable transmission filter" refers to an adjustable filter that may be used to filter an outgoing signal and/or a signal being conditioned prior to transmission.

In addition, an adjustable filter as described herein may be located within a receiver, a transmitter, or a device that is capable of functioning as both a receiver and a transmitter. For example, a mobile wireless communication device and a base station within a wireless communication system may both be capable of transmitting and receiving. Thus, an adjustable receive band filter or an adjustable transmit band filter (or both) may be used in a mobile wireless communication device or in a base station.

When selected filter elements are connected in a particular arrangement, the arrangement forms a filter that has a particular frequency response dependent on the selected filter elements. The response of the filter formed by the arrangement of filter elements may have a band pass filter response where signals within a desired frequency band are attenuated less than frequencies outside the desired frequency band. Also, the filter may have a stop-band filter response where signals within a stop band are attenuated more than frequencies outside the desired frequency band. The filter may have low pass filter response where signals below a selected frequency are attenuated less than frequencies above the frequency. Where signals below a selected frequency are attenuated more than frequencies above the frequency, the filter has a high pass filter response.

FIG. 1A is block diagram of an adjustable filter 2 and a controller 4. The adjustable filter 2 is implemented within a wireless communication device and may be a component of a transmitter or receiver. The controller 4 adjusts the frequency response 18 of the filter 2 based on location information 8, radio activity information 10, assigned transmission codes 11 and/or a combination of the three. Radio activity information 10 may include information regarding radio transmissions from other devices 12 such as frequency spectrum information, information regarding a status of an internal radio 14, and/or a combination of the two. The internal radio is a transmitter and/or receiver within the wireless communication device other than the transmitter or receiver that includes the adjustable filter 2. In some circumstances, the other internal radio may also have adjustable filters.

Signals received at a signal input 16 are processed by the filter 2 in accordance with the frequency response 18 of the filter and a filtered output signal 20 is presented at a signal output 22. The filter 2 is responsive to a control signal 24 received at a control input 26 and the frequency response 18 can be changed by the controller 4 using a control signal 24. The frequency response may be a high pass, low pass, notch, band pass, or band stop response or may be a combined response.

Figure 1B:
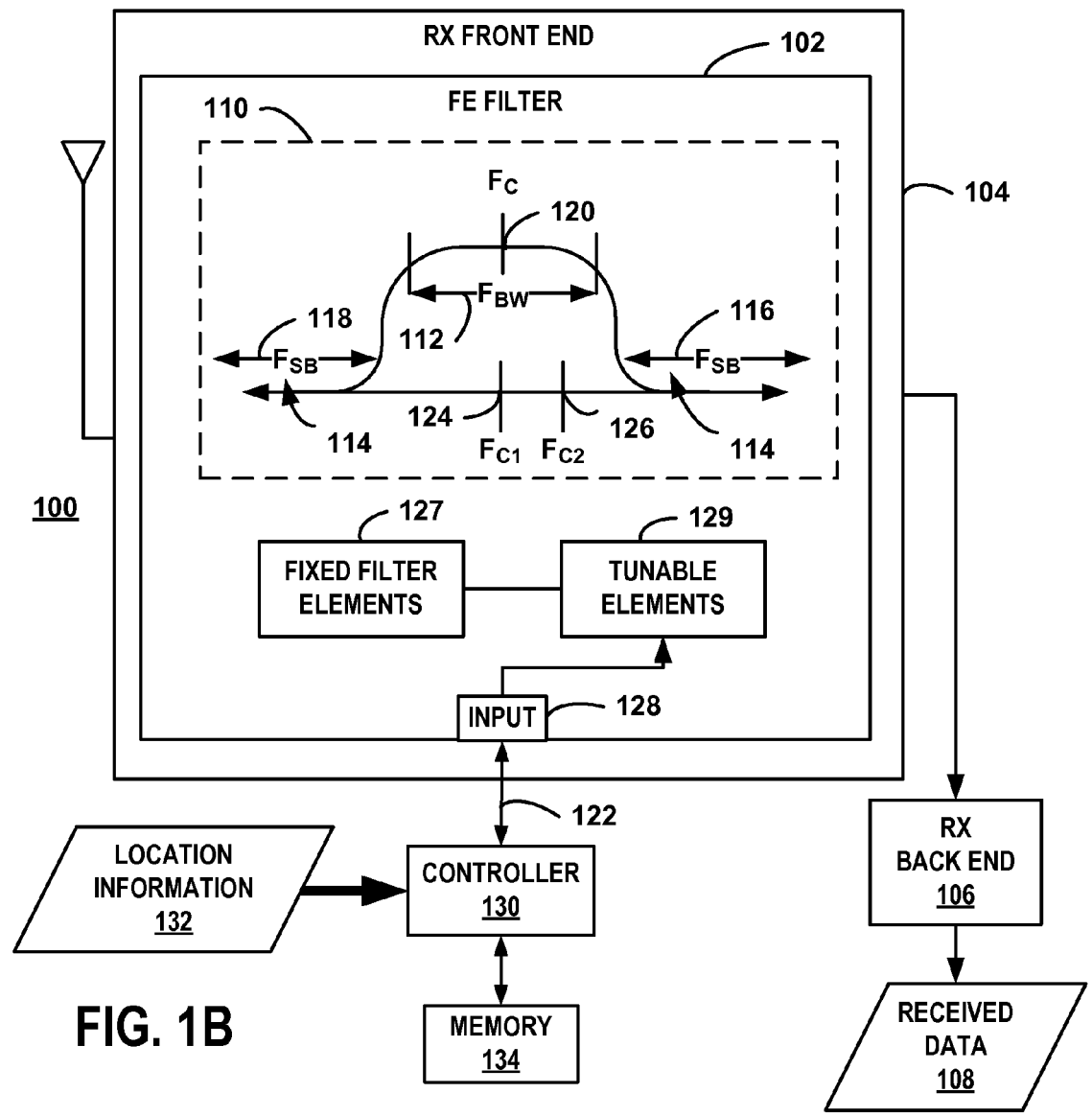
FIG. 1B is a block diagram of a receiver with an adjustable filter.

FIG. 1B is a block diagram of receiver 100 with adjustable filter 102. Signals received through the antenna are processed by a receiver (RX) front end (FE) 104 before processing by a receiver (RX) back end 106. For this example, the receiver front end 104 includes at least one adjustable filter 102 and a low noise amplifier (not shown) and may include other components such as mixers, oscillators, analog to digital converters, and/or other analog devices. The adjustable filter 102 may be a front end (FE) filter near the antenna or an inter-stage filter (not shown). The receiver front end 104 sufficiently processes the incoming signals to provide a portion of the spectrum that includes the desired signal at an adequately high energy to allow the receiver back end 106 to demodulate and otherwise process the incoming signal to recover the transmitted data, which is output as received data 108.

In accordance with the example discussed with reference to FIG. 1B, a controller 4, such as the controller 130, generates control signal 122 to adjust the adjustable filter 102 based on a geographic location of receiver 100. The geographic location information 132, indicating the geographic location of receiver 100, may be determined and/or received from any of several sources. Examples of suitable location information sources include GPS location information, location data transmitted from base stations, and programmed location data within the wireless communication device. These examples are discussed more fully below. Where the geographical location data is based on programmed data, the location may not reflect the actual geographical location of the device at all times. Therefore, programmed data (e.g., stored in the wireless communication device) is based on the anticipated location of operation of the receiver and it does not reflect the actual location of the receiver when the receiver is operating outside of the anticipated region. Further, the location information 132 may include region information indicating the operation region where the receiver is located.

The various functions and operations of the blocks described with reference to the receiver 100 may be implemented in any number of devices, circuits, or elements using any combination of software, hardware and/or firmware. Two or more of the functional blocks may be integrated in a single device, and the functions described as performed in any single device may be implemented over several devices. For example, at least portions of the functions of the RX (e.g., receiver) back end 106 may be performed by the controller 130 in some circumstances.

The adjustable filter 102 has a frequency response 110 that includes a pass band 112 and a stop band 114 where signals within pass band 112 are attenuated less than signals attenuated within the stop band 114. The adjustable filter 102 is typically a band pass filter where the stop band 114 includes one portion 116 above and another portion 118 below the pass band 112 in frequency. In some circumstances, the filter 102 may be another type of filter such as a high pass filter or a low pass filter. A bandpass filter may also be constructed from a series combination of a low pass and a high pass filter, one or both of which may be tunable, or fix tuned, as desired. Additional transmission zeros may be added as well to any of the filter types. They too may be fix tuned or tunable. The frequency response 110 has a center frequency ($F_C$) 120 and a pass band 112. The bandwidth ($F_{BW}$) is the width of the pass band 112 typically defined between the 3 decibel (dB) points where the frequency response is 3 dB lower than the response at the center frequency 120.

The adjustable filter 102 is responsive to a control signal 122 allowing the frequency response 110 to be changed by the control signal 122. For example, the pass band 112 and/or the center frequency 120 may be adjusted with the control signal 122. The center frequency 120 of the frequency response 110, therefore, can be shifted from a first center frequency ($F_{C1}$) 124 to a second center frequency ($F_{C2}$) 126 where the first center frequency 124 may either be higher or lower than the second center frequency 126. The pass band 112 can be changed from a first bandwidth to a second bandwidth.

The control signal 122 may include any number of signals that may be direct current (DC), alternating current (AC), pulse width modulated (PWM), digital, and/or analog voltages. Further, the control signal 122 may be a digital word or other digital representation where the adjustable filter 102 includes adequate hardware and/or software for deciphering the control data. Accordingly, the control input 128 of the adjustable filter 102 may include a single conductor or multiple conductors depending on the particular adjustable filter 102 design. An example of a suitable adjustable filter 102 includes a filter having fixed filter elements 127 and one or more tunable elements 129 such as voltage variable capacitors (VVCs), Microelectromechanical systems (MEMS) components, diodes, and varactors. The number, type and size of fixed filter elements 127 and tunable elements 129 may depend on several factors such as center frequency, bandwidth, required change in center frequency and/or bandwidth, rejection, and maximum loss, for example.

Figure 2:
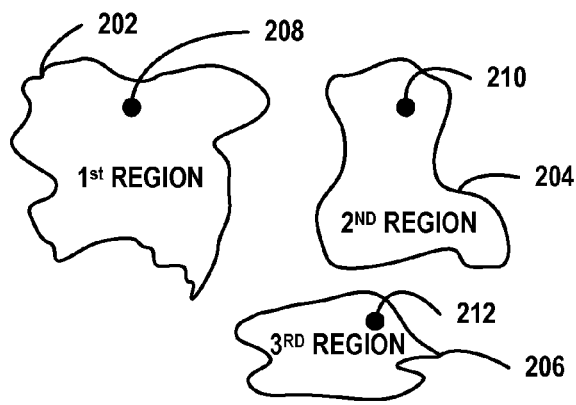
FIG. 2 is an illustration of a sample region arrangement.

FIG. 2 is an illustration of a sample region arrangement. For the example illustrated in FIG. 2, three regions 202, 204, 206 are shown. The total number of regions, however, may be any number equal to two or more depending on the particular system and implementation. Each region 202, 204, 206 has at least one geographic location within the region and typically will have numerous geographic locations contained within the particular region. Accordingly, for the example of FIG. 2, the first region 202 includes at least one geographic location 208, second region 204 includes at least one geographic location 210, and third region 206 includes at least one geographic location 212. The regions may have any of numerous sizes, shapes and relative positions to other regions. The closed shaped regions shown in FIG. 2 do not necessarily depict any size, shape, relative position, or scale.

In one aspect, the controller 130 may evaluate location information 132 to determine the region within which the receiver 100 is located. Any one of numerous known techniques can be used to determine if the geographic location of the receiver 100 is within a particular region. Examples include GPS techniques and base station triangulation techniques. After determining the region, the controller 130 may provide the appropriate control signal 122 to the control input 128 to adjust the frequency response 110 to a response that corresponds to the region within which the receiver 100 is located. As discussed below, controller 130 may further adjust the adjustable filter 102 based on other factors in addition to region. In some circumstances, the location information 132 includes region information that may directly indicate the region in which the receiver is located.

FIG. 3, FIG. 4, FIG. 5, FIG. 6, and FIG. 7 are graphical representations of frequency spectrum for the examples of the frequency response 110 adjustment. The designation of "first" and "second" in FIGS. 3-7 does not necessarily represent first response and second response as established in time. In other words, the frequency response 110 can be adjusted from a second frequency response to a first frequency response and vice versa, depending on the particular situation.

Figure 3:
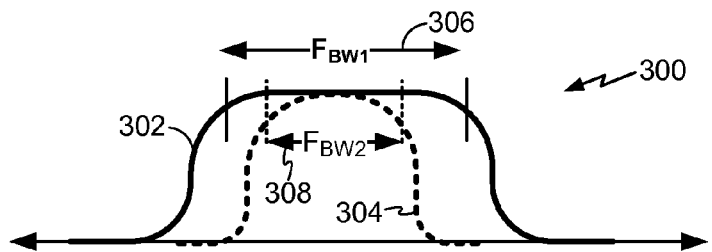
FIG. 3 is a graphical representation of a frequency spectrum for an example of a frequency response adjustment.

FIG. 3 is a graphical representation of a frequency spectrum 300 of an example of a first frequency response 302 and a second frequency response 304 where the pass band 112 is adjusted and the center frequency is unchanged. The first frequency response bandwidth ($F_{BW1}$) 306 is wider than the second frequency response bandwidth ($F_{BW2}$) 308 for the example of FIG. 3. Accordingly, the controller 130 may select the first frequency response 302 for a region where a wider pass band is preferred to a response with a narrower pass band, and the second frequency response 304 may be selected for a region where a narrower pass band is preferred to a wider pass band.

Figure 4:
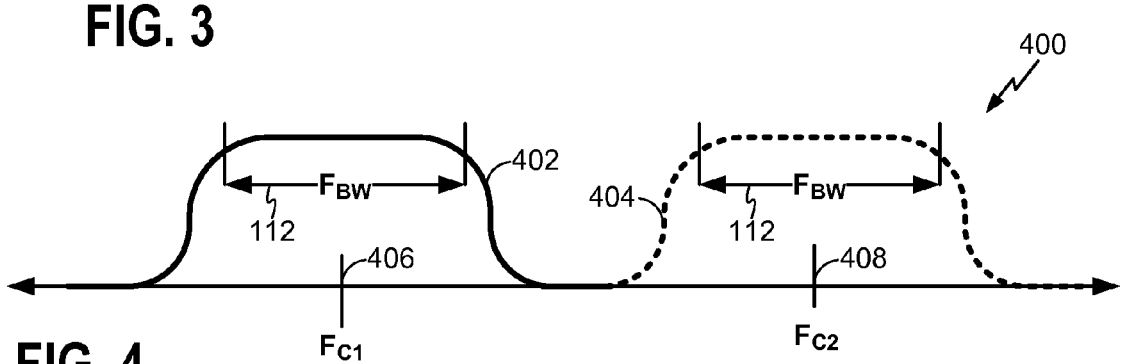
FIG. 4 is a graphical representation of a frequency spectrum for an example of a frequency response adjustment.

FIG. 4 is a graphical representation of a frequency spectrum 400 of an example of a first frequency response 402 and a second frequency response 404 where the pass band 112 is not adjusted and the center frequency is adjusted from a first center frequency to a second center frequency. The first frequency response center frequency ($F_{C1}$) 406 is lower than the second frequency response center frequency ($F_{C2}$) 408 for the example of FIG. 4. Accordingly, the controller 130 may select the first frequency response 402 for a region where a lower center frequency is preferred to a response with a higher center frequency, and second frequency response 404 may be selected for a region where a higher center frequency is preferred to a lower center frequency.

Figure 5:
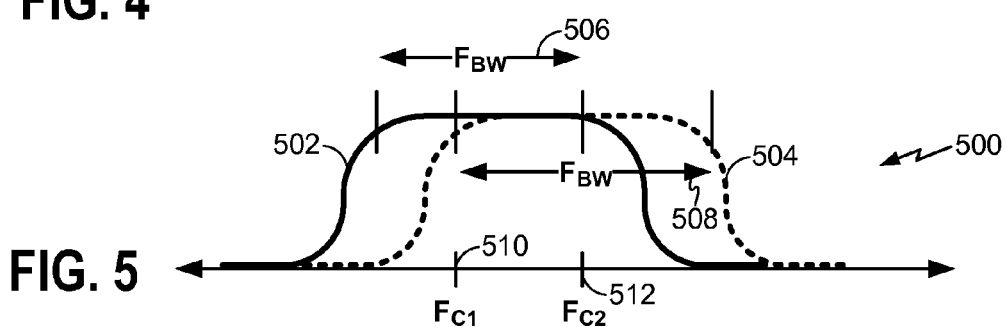
FIG. 5 is a graphical representation of a frequency spectrum for an example of a frequency response adjustment.

FIG. 5 is a graphical representation of a frequency spectrum 500 of an example of the first frequency response 502 and the second frequency response 504 where the center frequency is adjusted and the first and second frequency responses at least partially overlap. The first frequency response bandwidth 506 is the same as the second frequency response bandwidth 508 for the example of FIG. 5. Accordingly, the controller 130 may select the first frequency response 502 for a region where the communication channels are centered at the first frequency response center frequency ($F_{C1}$) 510. The second filter frequency response 504 may be selected for a region where the communication channels are centered at second frequency response center frequency ($F_{C2}$) 512.

Figure 6:
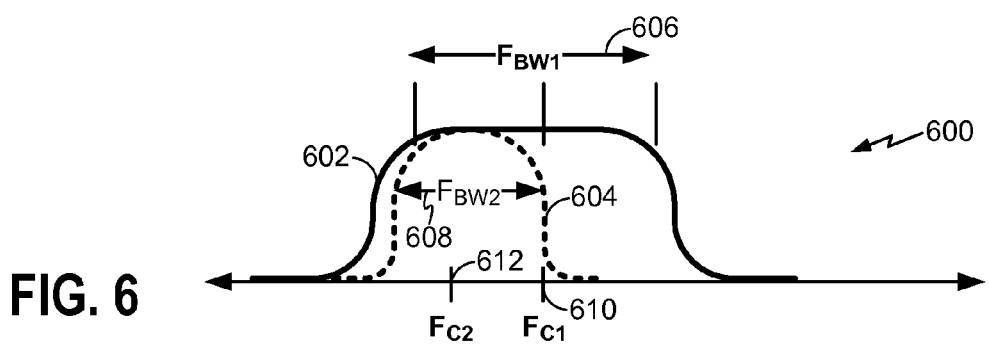
FIG. 6 is a graphical representation of a frequency spectrum for an example of a frequency response adjustment.

FIG. 6 is a graphical representation of a frequency spectrum 600 of an example of the first frequency response 602 and the second frequency response 604 where the pass band 112 is adjusted and the first and second frequency responses at least partially overlap. The first frequency response bandwidth 606 is wider than the second frequency response bandwidth 608 for the example of FIG. 6. Accordingly, the controller 130 may select the first frequency response 602 for a region where a wider pass band is preferred to a response with a narrower pass band, and second frequency response 604 may be selected for a region where a narrower pass band is preferred to a wider pass band. The first frequency response center frequency ($F_{C1}$) 610 is higher than the second frequency response center frequency ($F_{C2}$) 612 in this example. Other arrangements are possible.

Figure 7:
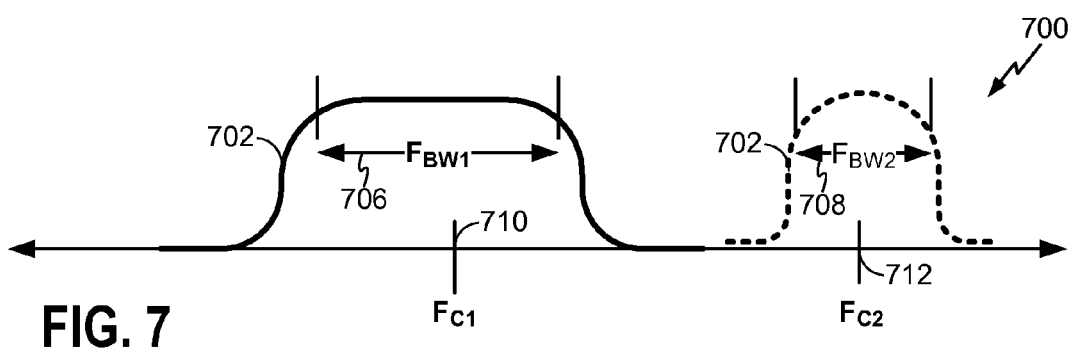
FIG. 7 is a graphical representation of a frequency spectrum for an example of a frequency response adjustment.

FIG. 7 is a graphical representation of a frequency spectrum 700 of an example of a first frequency response 702 and a second frequency response 704 where the pass band 112 and the center frequency are adjusted such that the first frequency response 702 and the second frequency response 704 do not overlap. The first frequency response bandwidth ($F_{BW1}$) 706 is wider than the second frequency response bandwidth ($F_{BW2}$) 708 for the example of FIG. 7. Accordingly, the controller 130 may select the first frequency response 702 for a region where a wider pass band is preferred to a response with a narrower pass band, and the second frequency response 704 may be selected for a region where a narrower pass band is preferred to a wider pass band. The first frequency response center frequency ($F_{C1}$) 710 is lower than the second frequency response center frequency ($F_{C2}$) 712 for the example of FIG. 7. Accordingly, the controller 130 may select first frequency response 702 for a region where a lower center frequency is preferred to a response with a higher center frequency, and the second frequency response 704 may be selected for a region where a higher center frequency is preferred to a lower center frequency.

Figure 8:
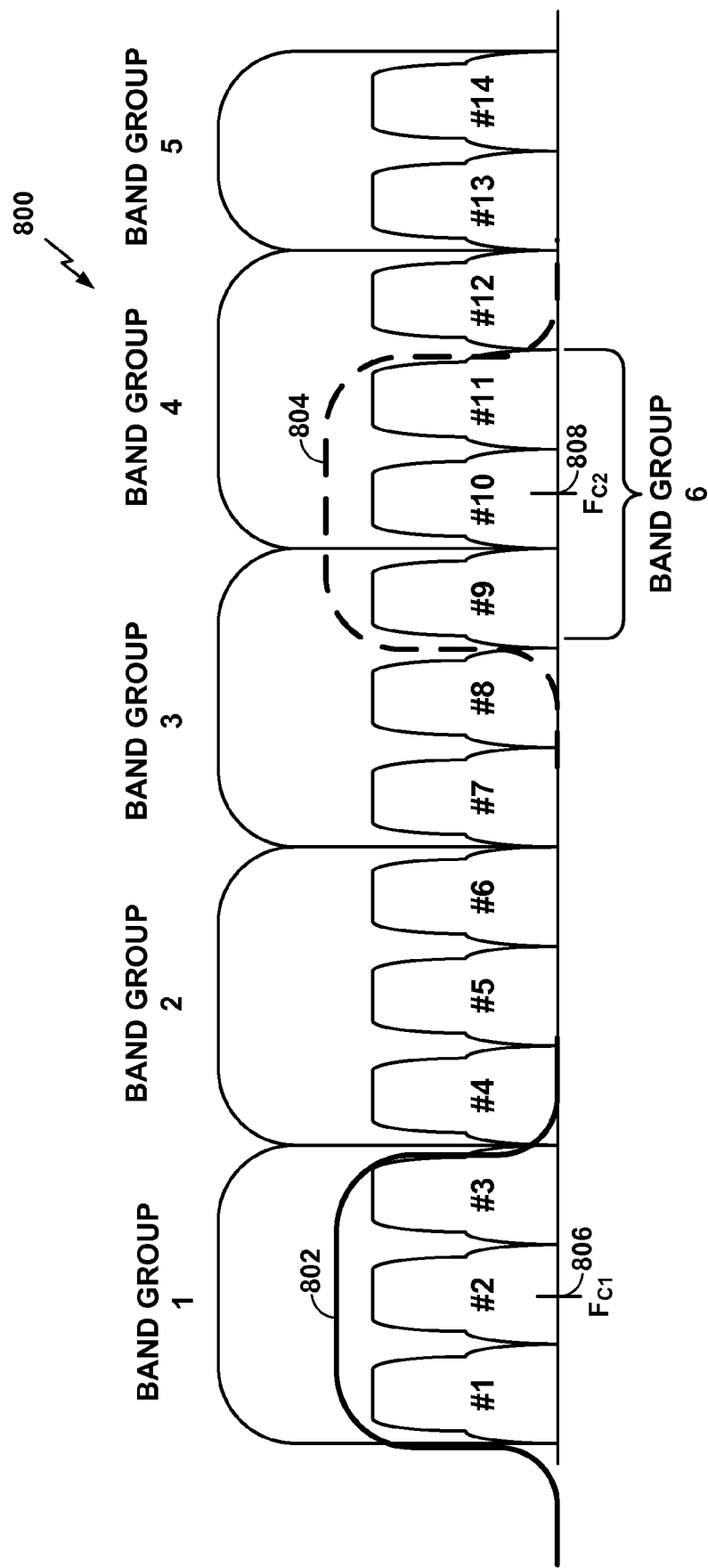
FIG. 8 is a graphical representation of a frequency spectrum with band groups for an example of a frequency response adjustment.

FIG. 8 is a graphical representation of a frequency spectrum 800 for a filter adjustment within a system having channel allocation in accordance with an Ultra-wideband (UWB) channel allocation. The UWB plan allocates 14 channel bands that are assigned to six band groups. All band groups include 3 channel bands except for Band Group 5 which includes two channel bands. No band groups overlap except for Band Group 6 which includes channel band #9 from Band Group 3 and channel bands #10 and #11 from Band Group 4. Different regulatory regions have restricted the use of the UWB channel bands to selected channel bands. For example, the United States permits the use of channel bands #1-#14. The European Union permits the use of channel bands #7-#10 and bands #1, #2, #3, and #11 with some restrictions. Japan permits the use of channel bands #9-#13 and bands #2 and #3 with some restrictions. Other regions may have their own requirements. In addition to operating within a specific Band Group, a wireless device may have an assigned transmission code indicating at least one assigned channel band, and the frequency response may be based on this assigned transmission code.

For the example in FIG. 8, first frequency response 802 covers Band Group 1, which may be used, for example, in the United States. Second frequency response 804 covers Band Group 6, which may be used, for example, in Japan. Based on the established UWB standard, center frequency ($F_{C1}$) 806 of Band Group 1 is 3960 MHz, and center frequency ($F_{C2}$) 808 of Band Group 6 is 8184 MHz. The pass band bandwidth of both Band Group 1 and Band Group 6 is 1584 MHz since each channel band has a bandwidth of 528 MHz and both Band Group 1 and Band Group 6 each contain three channel bands.

In accordance with an example of adjusting an adjustable filter, the adjustable filter could be adjusted in the example of FIG. 8 in a manner similar to that shown in FIG. 4 in which the center frequency is changed and the pass band bandwidth is kept the same. This type of filter adjustment capability can advantageously permit the same device to be used in regions with different communications standards and regulations. It is worth noting that other filter adjustment combinations (e.g., center frequency and pass band bandwidth) may be used. Any of the frequency response adjustments discussed with reference to FIGS. 3-7 may be applied to the UWB channel allocation as well as other frequency response adjustments depending on the particular circumstances.

Figure 9:
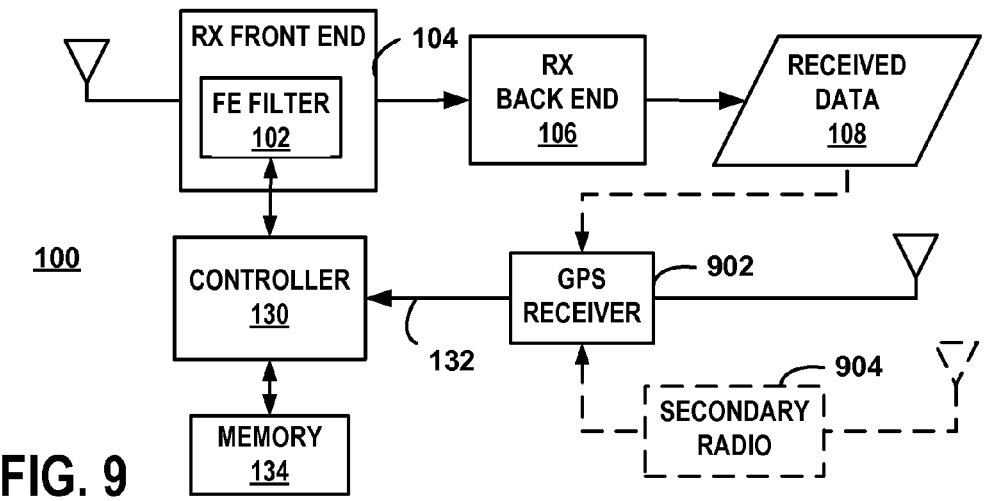
FIG. 9 is a block diagram of a receiver where the geographic location information is received from a Global Positioning System (GPS) receiver.

FIG. 9 is a block diagram of receiver 100 where the geographic location information is received from a Global Positioning System (GPS) receiver 902. The GPS receiver 902 receives signals from satellites to determine a geographic location. In some circumstances, assist data may be provided to the receiver 100 through a wireless communication system. FIG. 9 shows a dashed line extending from the data 108 to the GPS receiver 902 and the controller 130 to illustrate that in some circumstances, GPS related data may be provided by the network from which the receiver is receiving signals. In addition, some GPS or location information may be provided by a secondary radio 904, the memory or other sources. Further, calculations to determine the geographic location may be performed, at least partially, by a position determining entity (PDE) or other network equipment. Location information 132 received by the controller 130 from the GPS receiver 902 is processed to determine the service region in which the mobile device is located.

Figure 10A:
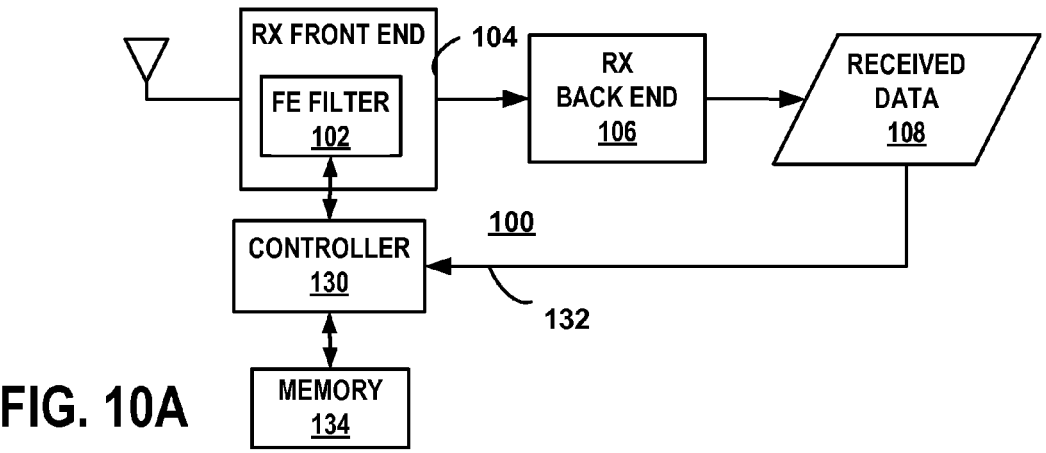
FIG. 10A is a block diagram of a receiver where the geographic location information is received from one or more base stations of a wireless communication system.

FIG. 10A is a block diagram of the receiver 100 where the geographic location information is received from one or more base stations of a wireless communication system. For example, the receiver 100 receives signals from a base station and processes the received signals with the receiver front end 104 and the receiver back end 106 in order to send geographic location information 132 to the controller 130. Location information 132 received by the controller 130 is processed to determine the service region in which the mobile device is located. Where the adjustable filter is within the receiver, a default state for the filter is established based on a last known location or other criteria. Accordingly, the initial parameters of the adjustable filter are determined to establish the best performance before additional location information is received.

Figure 10B:
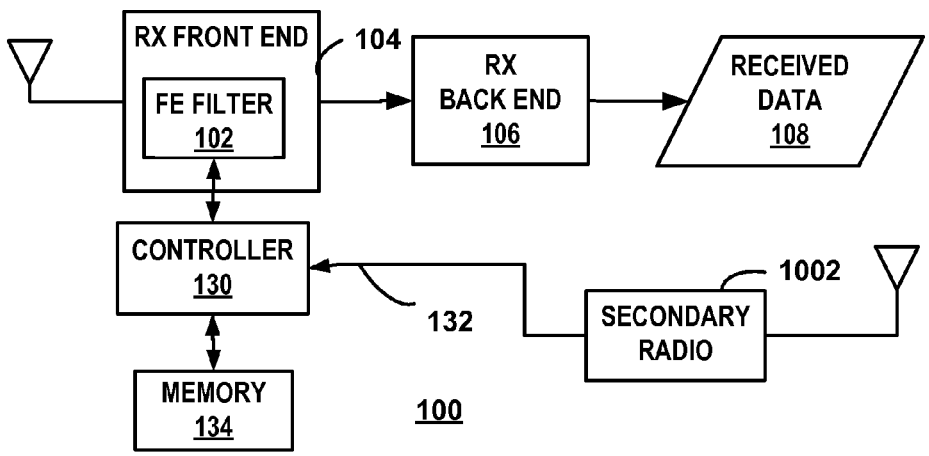
FIG. 10B is a block diagram of the receiver where the geographic location information is received from one or more base stations of a wireless communication system through a secondary radio.

FIG. 10B is a block diagram of the receiver 100 where the geographic location information is received from one or more base stations of a wireless communication system through a secondary radio 1002. The secondary radio 1002 may receive signals from a second network different from the network from which the receiver is receiving signals. The geographic location information 132 is received by the secondary radio 1002 and provided to the controller 130. Location information 132 received by controller 130 is processed to determine the service region in which the mobile device is located.

Figure 10C:
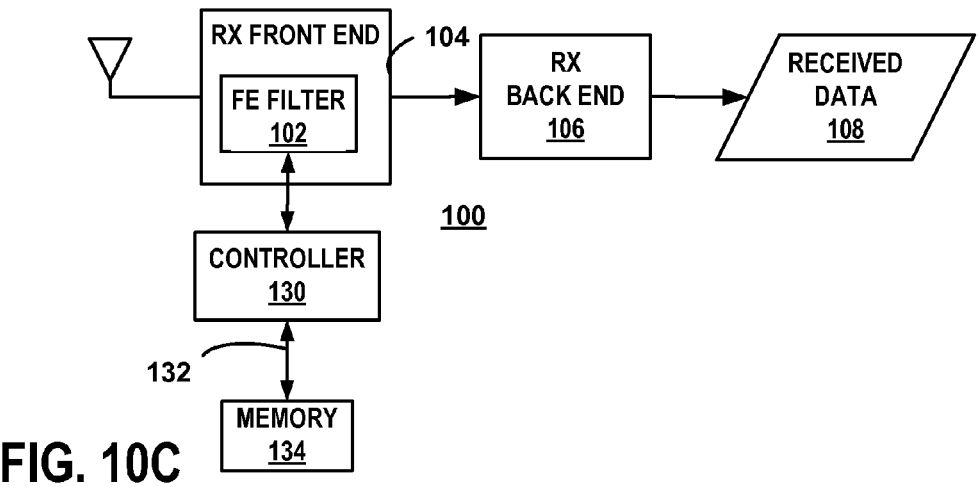
FIG. 10C is a block diagram of a receiver where the geographic location information is programmed into memory of a wireless communications device.

FIG. 10C is a block diagram of the receiver 100 where the geographic location information is programmed into the memory 134 of a wireless communications device. The location information may be entered into the memory during the manufacturing process, during initialization, or at other times. Where a particular device is designated to be shipped to a particular region where the device will be used, the location information may be entered to reflect that region. Further, the location information may be programmed when the device is purchased and initialized. If a device is moved to a new region, a re-initialization procedure invoked by the user or service provider may include changing the location information. Thus, the receiver 100 receives geographic location information 132 from the memory 134. Location information 132 received by the controller 130 from memory 134 is processed to determine the service region in which the mobile device is located. The filter settings corresponding to the preferred filter response are established by sending the appropriate control signals to the adjustable filter.

Figure 10D:
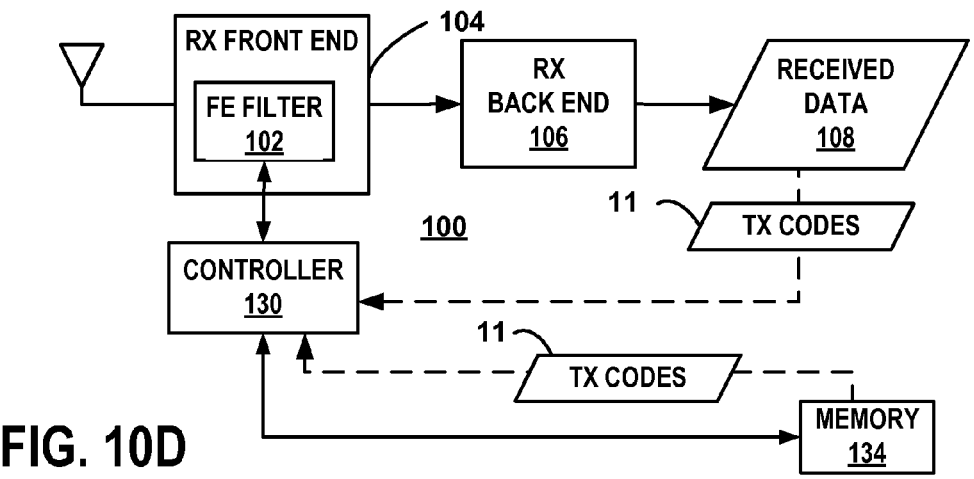
FIG. 10D is a block diagram of the receiver 100 where the controller 130 adjusts the filter 102 based on transmission codes 11.

FIG. 10D is a block diagram of the receiver 100 where the controller 130 adjusts the filter 102 based on transmission codes 11. The transmission codes may be assigned prior to operation and stored in memory 134 or may be assigned dynamically by the network. Further, the transmission codes 11 may be assigned by the network and subsequently stored in memory 134 for later retrieval. The dashed lines in FIG. 10D indicate that the transmission codes may be received through any of numerous sources or combination of sources depending on the particular situation and implementation. The controller 130 may adjust the filter 102 at least partially based on the transmission codes 11. In some circumstances, the assigned transmission codes may indicate the geographic location of the device including the receiver 100 since a particular transmission code may only be assigned in a particular region. Accordingly, the transmission codes 11 may be location information 132 in some situations. The controller 130 may adjust the filter based on a combination of transmission code 11 information, location information and/or radio activity information. An example of a filter adjustment based on transmission codes 11 includes a situation where less than all of the channels within a band group are assigned by the transmission codes 11, the controller 134 adjusts the center frequency and/or bandwidth to maximize efficiency and minimize noise for the particular channel allocation.

Figure 11A:
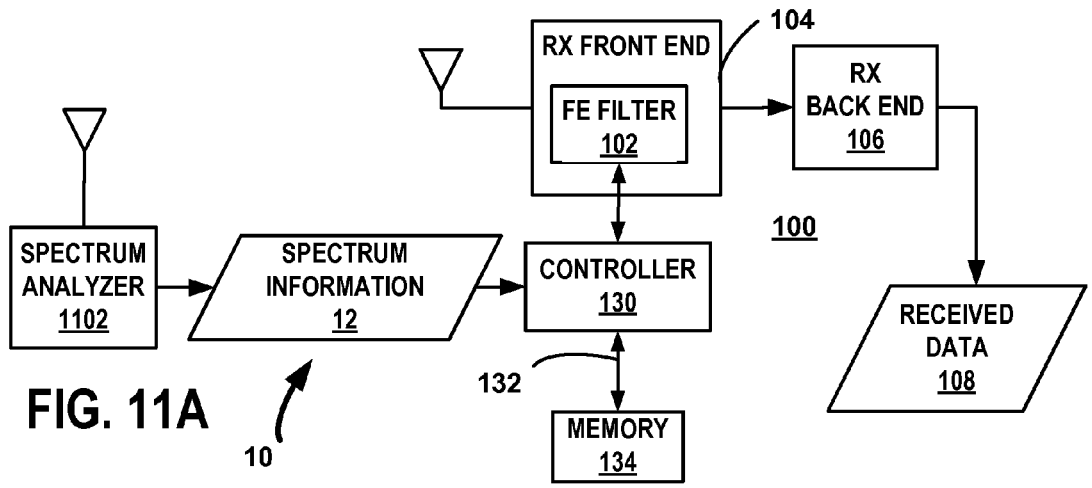
FIG. 11A is a block diagram of the receiver where the controller adjusts the frequency response based on spectral conditions.
Figure 11B:
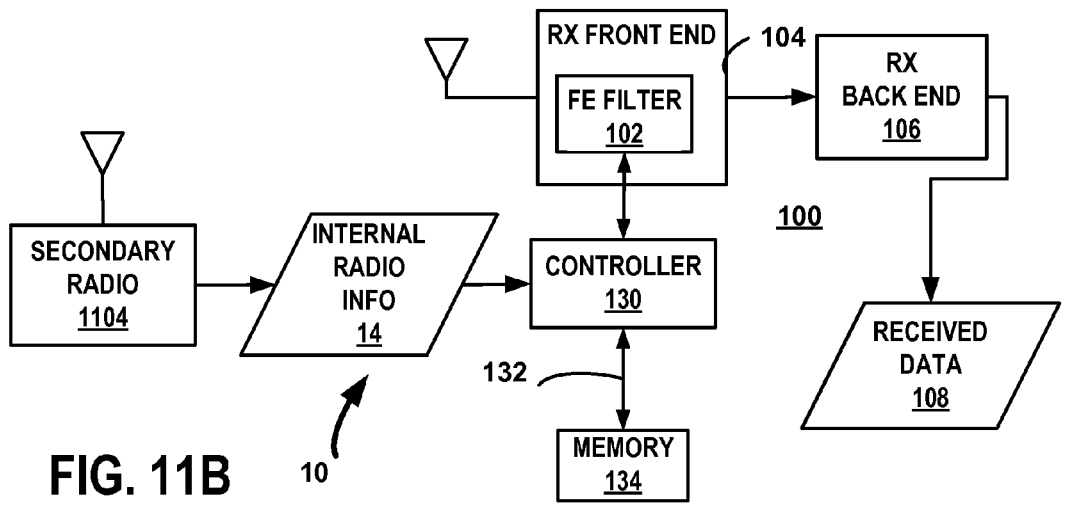
FIG. 11B is a block diagram of the receiver where the controller adjusts the frequency response based on a status of an internal radio within the device housing the receiver.

FIG. 11A and FIG. 11B are block diagrams of the receiver 100 where the controller adjusts the frequency response based on radio activity. Radio activity information 10 describing the radio activity may include frequency spectrum information 12, internal radio status information 14 or a combination of the two. FIG. 11A illustrates an example where the radio activity information includes spectrum information and FIG. 11B illustrates an example where the radio activity information 10 includes internal radio information 14. In some circumstances, the spectrum information 12 may provide information regarding the status of an internal radio. This may occur, for example, where the device used to capture the spectrum information (spectrum analyzer) detects energy transmitted by the secondary internal radio of the communication device that also includes receiver 100.

FIG. 11A is a block diagram of the receiver 100 where the controller adjusts the frequency response based on frequency spectrum information 12. A spectrum analyzer 1102 provides information 12 regarding the frequency spectrum. The spectrum analyzer 1102 is any combination of hardware, software and/or firmware that provide information regarding transmitted signals within a selected frequency band. Examples of the spectrum analyzer include energy detectors, power detectors, and signal detectors Implementations of the spectrum analyzer 1102 include a receiver connected to processors where the processor determines that transmitted energy is present at a particular frequency or within a particular frequency band. Accordingly, a processor may integrate over a frequency band and process the data to determine whether a transmitted signal is present. Therefore, at least portions of the controller 130 and the receiver front end 104 may be used to implement the spectrum analyzer 1102 in some situations. Further, the spectrum analyzer may be implemented with a separate processor memory and hardware components in some circumstances.

The controller 130 evaluates the spectrum information 12 to determine an appropriate frequency response for the adjustable filter based on the signals that are detected. Interference from a detected signal may be reduced by increasing rejection (increasing attenuation) of the adjustable filter at frequencies near the frequency of the interfering signal. In some circumstances, characteristics of the detected signals, such as frequency and modulation, may indicate the type of device that is transmitting the signal and the controller may adjust the filter based on an anticipated signal that is not yet detected but anticipated based on the identification of the interfering device. Further, characteristics of the detected signal may indicate a geographical region and the controller may adjust the filter based on the indentified geographical region. Accordingly, spectrum analysis may reveal information that indirectly results in the adjustment of the filter. In addition, the controller may adjust the level of rejection of the frequency response based on an energy, power, or amplitude of the detected signal.

In some circumstances, the bandwidth of the filter may be increased or the rejection decreased based on the spectrum analysis. For example, if no signals, or very few low level signals, are detected near the receive frequency, the controller may reduce rejection in order to increase the signal-to-noise ratio of the desired received signals.

The adjustment to the frequency response may be variable based on a calculated value or may be one of a limited number of predetermined responses. Where a calculation is performed, the control signals are based on calculated values and may be any of numerous values and combinations to set the bandwidth, center frequency or other characteristics. Where a response is selected from a set of frequency responses, the spectrum analysis indicates a circumstance that dictates a particular preferred frequency response that can be selected from a table or other correlation technique. For example, if a detected signal indicates that nearby devices are engaging in Bluetooth radio communications, a frequency response designed to minimize all or most interference from Bluetooth communications is employed by providing control signals in accordance with stored parameters corresponding to the frequency response.

FIG. 11B is a block diagram of the receiver 100 where the controller adjusts the frequency response based on a status of an internal radio within the device housing the receiver 100. Therefore, the device that includes the receiver 100 is a dual mode communication device or a multimode communication device that is capable of transmitting signals within at least two frequency bands. FIG. 11B illustrates a single secondary radio 1104. The device housing the receiver 100 however, may include more than one additional internal radio 1104. Further, the secondary radio 1104 may be capable of operating within more than one frequency band.

The secondary radio 1104 provides information 14 regarding the status of the radio 1104. The status may include one or more of the following parameters as well as others: on/off status (whether the radio is activated and operating), transmission status (whether the radio is transmitting), receive status (whether the radio is receiving signals), transmission frequency status (frequencies or frequency band of transmitted signals), receive frequency status (frequencies or frequency band of received signals), modulation status (type of modulation used for transmitted signals), and signal power status (power level of transmitted signals). Controller 130 processes the information 14 and selects an appropriate frequency response based on information to maximize the signal-to-noise ratio of the received signals of the receiver 100 of the primary radio. The selection of the frequency response may be based on any of numerous calculations or factors. Some examples include narrowing the pass band and/or shifting the center frequency to minimize interference from secondary radio transmitted signals that are near the receive band of the receiver 100, narrowing the pass band and/or shifting the center frequency to minimize interference from spurious emissions and intermodulation components, and widening the pass band and/or shifting the center frequency to increase signal-to-noise ratio when the secondary radio is inactive, not transmitting or transmitting at a low power level. Further, where the adjustable filter is within an inter-stage of the receiver rather than the front end, the frequency response may be adjusted to avoid intermodulation distortion of signals components leaking into the receiver 100 from the transmitter (or receiver) of the secondary radio.

The above discussions provide examples of a receiver 100 having an adjustable filter having a frequency response that is adjusted based on geographic location, frequency spectrum information, and the status of a secondary radio within the device housing the receiver 100. In some circumstances, the frequency response may be adjusted based on more than one set of information. For example, location information indicating the region where the receiver is operating and information indicating the presence of other device transmissions can both be evaluated by the controller 130 in determining the optimum frequency response. Although at least some of the examples provided above discuss the adjustable filter implemented within the front end of the receiver, the adjustable filter may be implemented within any portion of the receive chain. In addition, a receiver may include multiple adjustable filters where some or all of the filters are within a particular receive stage or are distributed throughout the receiver lineup.

FIGS. 12-15 provide examples of an adjustable filter implemented within a transmitter. The examples discussed below may be implemented in a device where adjustable filter techniques are applied only in the transmitter or may be implemented in devices where the adjustable filters are included in the receiver of the device and managed as discussed above. Adjustment of the transmission filter may include, for example, adjustment of a center frequency and/or a pass band bandwidth. The main reason to filter the TX signal is for harmonic rejection. There may be cases where close-in interference rejection is desired as well. Thus the transmission filter may contain tunable high pass, low pass, band pass and/or notch filters as required.

Some examples of how an adjustable transmission filter center frequency and/or pass band bandwidth may be adjusted are shown in FIGS. 3-8.

Figure 12:
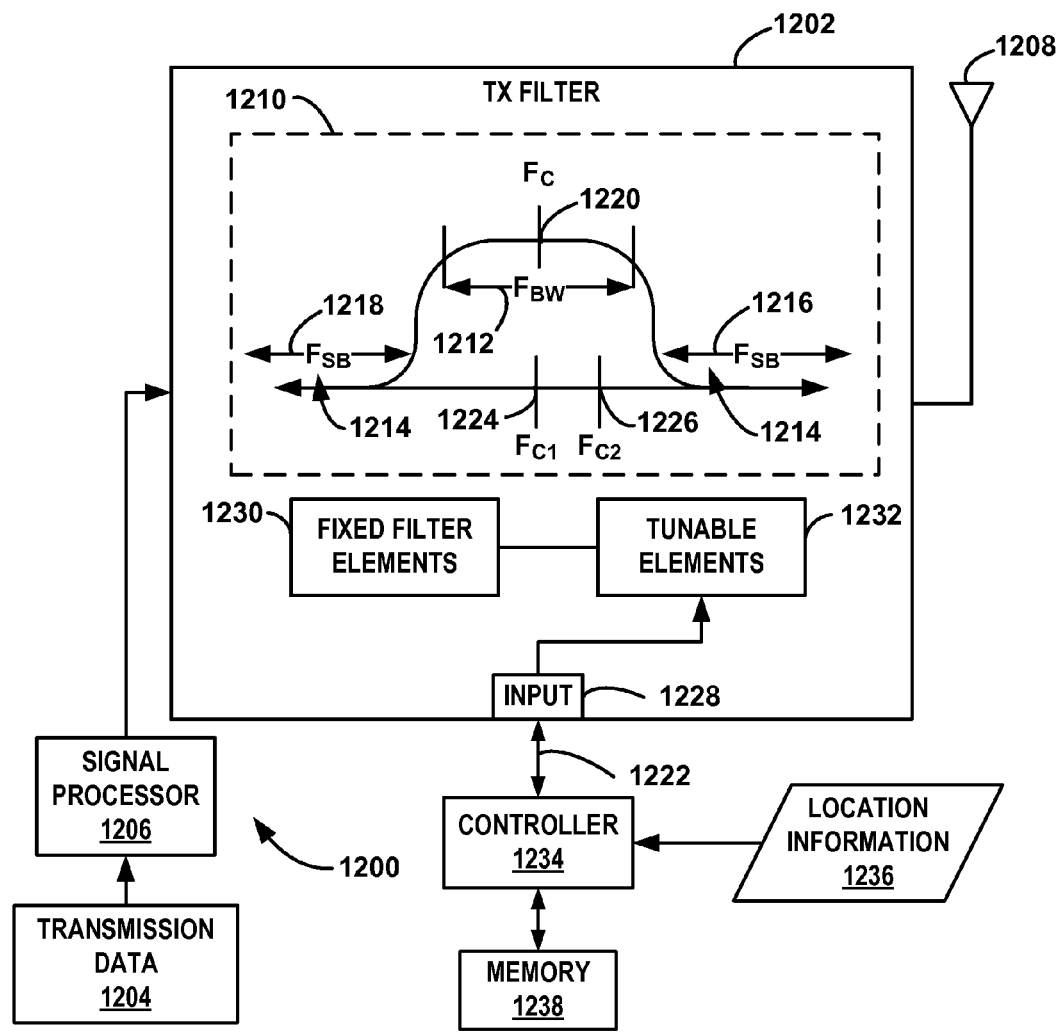
FIG. 12 is a block diagram of a transmitter with an adjustable filter.

FIG. 12 is a block diagram of a transmitter 1200 with an adjustable filter 1202. In the example of FIG. 12, the adjustable filter 1202 is an adjustable transmit (TX) band filter. The transmission data 1204 is data to be transmitted by the transmitter 1200. Before transmission, the transmit data 1204 may be conditioned and processed by a signal processor 1206. For example, signal processor 1206 may perform various functions such as modulating, scrambling, upconverting, and amplifying the transmission data 1204 prior to transmission. The signal processor 1206 may perform any additional signal processing that could enhance or improve the ability of the transmitter 1200 to transmit data. Although not shown, the transmitter 1200 may include other components such as mixers, oscillators, digital to analog converters, and/or other devices. Although the filter 1202 is illustrated immediately prior to the antenna 1208 in FIG. 12, the filter 1202 may be positioned anywhere within the transmitter 1200 relative to other components. For example, the filter 1202 may be positioned prior at an input or output of a mixer in some circumstances.

The adjustable filter 1202 sufficiently processes the outgoing signals to provide a portion of the spectrum that includes the desired signal at an adequately high energy to allow transmission via the antenna 1208. The adjustable filter 1202 has a frequency response 1210 that includes a pass band 1212 and a stop band 1214 where signals within the pass band 1212 are attenuated less than signals are attenuated within the stop band 1214. The adjustable filter 1202 is typically a band pass filter where the stop band 1214 includes one portion 1216 above and another portion 1218 below the pass band 1212. In some circumstances, the filter 1202 may be another type of filter such as a high pass filter or a low pass filter. The frequency response 1210 has a center frequency ($F_C$) 1220 and a pass band 1212. The bandwidth ($F_{BW}$) is the width of pass band 1212 typically defined between the 3 decibel (dB) points where the frequency response is 3 dB lower than the response at the center frequency 1220.

The adjustable filter 1202 is responsive to a control signal 1222 allowing the frequency response 1210 to be changed by the control signal 1222. For example, pass band 1212 and/or center frequency 1220 may be adjusted with control signal 1222. Center frequency 1220 of frequency response 1210, therefore, can be shifted from the first center frequency ($F_{C1}$) 1224 to the second center frequency ($F_{C2}$) 1226 where the first center frequency 1224 may either be higher or lower than the second center frequency 1226. The pass band 1212 can be changed from a first bandwidth to a second bandwidth.

The control signal 1222 may include any number of signals that may be direct current (DC), alternating current (AC), pulse width modulated (PWM), digital, and/or analog voltages. Further, the control signal 1222 may be a digital word or other digital representation where the adjustable filter 1202 includes adequate hardware and/or software for deciphering the control data. Accordingly, the control input 1228 of the adjustable filter 1202 may include a single conductor or multiple conductors depending on the particular adjustable filter 1202 design. An example of a suitable adjustable filter 1202 includes a filter having fixed filter elements 1230 and one or more tunable elements 1232 such as voltage variable capacitors (VVCs), Microelectromechanical systems (MEMS) components, diodes, and varactors. The number, type and size of the fixed filter elements 1230 and tunable elements 1232 may depend on several factors such as center frequency, bandwidth, required change in center frequency and/or bandwidth, rejection, and maximum loss, for example.

In accordance with the example discussed with reference to FIG. 12, the controller 1234 generates one or more control signals 1222 to adjust the adjustable filter 1202 based on a geographic location of the transmitter 1200. The geographic location information 1236, indicating the geographic location of transmitter 1200, may be determined and/or received from any of several sources. Examples of suitable location information sources include GPS location information, location data transmitted from base stations, and programmed location data within a device in a memory 1238. These examples are discussed more fully below. Although programmed data (e.g., stored in a wireless communication device/base station) is based on the anticipated location of operation of the transmitter 1200, it may not reflect the actual location of the transmitter 1200 when the transmitter 1200 is operating outside of the anticipated region of operation.

The various functions and operations of the blocks described with reference to transmitter 1200 may be implemented in any number of devices, circuits, or elements using any combination of software, hardware and/or firmware. Two or more of the functional blocks may be integrated in a single device, and the functions described as performed in any single device may be implemented over several devices. For example, at least portions of the functions of signal processor 1206 may be performed by controller 1234 in some circumstances. In addition, other configurations of transmitter 1200 could be implemented in which the signal processing performed by signal processor 1206 could be performed after the transmission data 1204 is filtered by the adjustable filter 1202.

As described above, FIG. 2 shows an example of a sample region arrangement. For the example illustrated in FIG. 2, three regions 202, 204, 206 are shown.

In one aspect, the controller 1234 may evaluate location information 1236 to determine the region within which transmitter 1200 is located. Any one of numerous known techniques can be used to determine if the geographic location of the transmitter 1200 is within a particular region. After determining the region, the controller 1234 may provide the appropriate control signal 1222 to the control input 1228 to adjust the frequency response 1210 to a response that corresponds to the region within which transmitter 1200 is located. As discussed herein, the controller 1234 may further adjust the adjustable filter 1202 based on other factors in addition to, or alternatively to, the region.

FIGS. 3-8, discussed in detail above, are graphical representations of frequency spectrum for examples of frequency response adjustment that can be applied to an adjustable transmission filter. The adjustments shown in FIGS. 3-8 may be made for a variety of reasons and in connection with a variety of filter types.

Figure 13A:
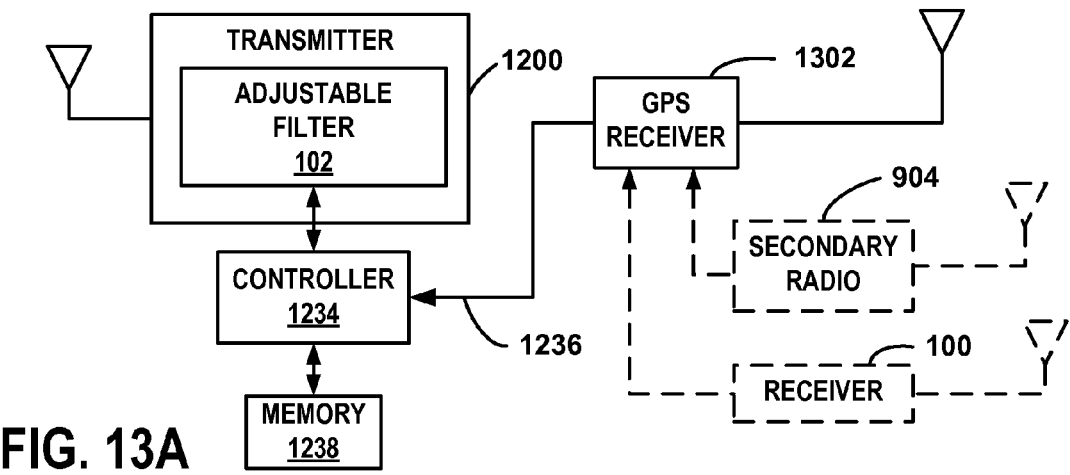
FIG. 13A is a block diagram of the transmitter where the geographic location information is received from a Global Positioning System (GPS) receiver.

FIG. 13A is a block diagram of the transmitter 1200 where the geographic location information 1236 is received from a Global Positioning System (GPS) receiver 1302. As discussed above, a GPS receiver 1302 receives signals from satellites to determine a geographic location. In some circumstances, assist data may be provided to the device housing the transmitter 1200 through a wireless communication system. Further, calculations to determine the geographic location may be performed, at least partially, by a position determining entity (PDE) or other network equipment. A secondary radio 904 and receiver are illustrated with dashed lines to indicate that in some circumstances, GPS related information may be received from a radio. Accordingly, a receiver 100 communicating with the same network as the transmitter 1200 and/or a receiver in secondary radio 904 communicating within a different frequency band may provide at least some information related to determining the location GPS location. The location information 1236 received by the controller 1234 from the GPS receiver 1302 is processed to determine the service region in which the transmitter is located.

Figure 13B:
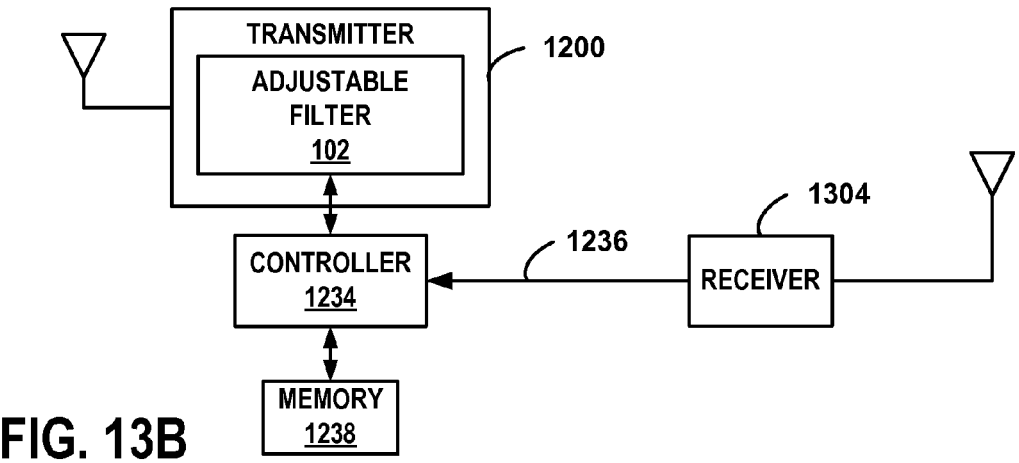
FIG. 13B is a block diagram of transmitter where the geographic location information is received from one or more base stations and/or base station controllers (not shown) of a wireless communication system.

FIG. 13B is a block diagram of transmitter 1200 where the geographic location information 1236 is received from one or more base stations and/or base station controllers (not shown) of a wireless communication system. For example, a receiver 1304 receives location information 1236 from a base station. The location information 1236 received by the controller 1234 is processed to determine the service region in which the transmitter is located.

Figure 13C:
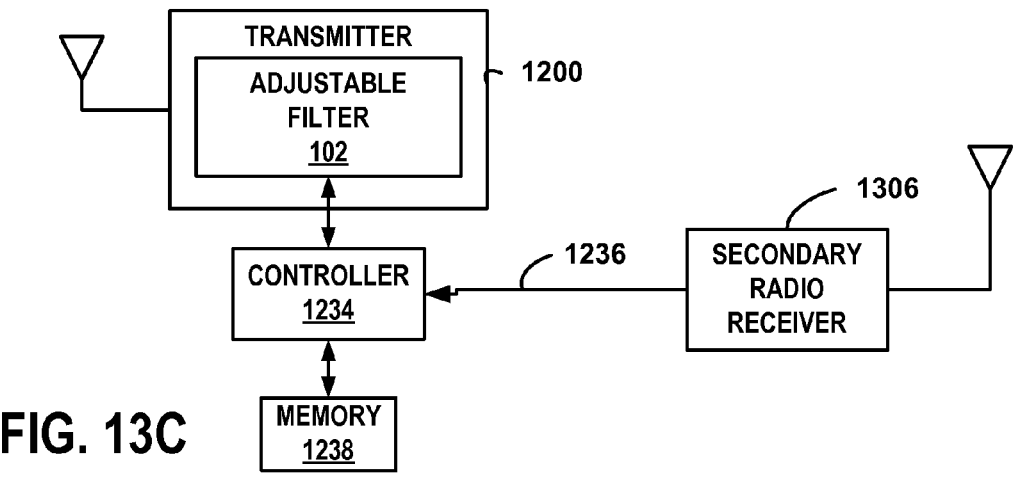
FIG. 13C is a block diagram of transmitter 1200 where the geographic location information 1236 is received through a secondary radio 1306.

FIG. 13C is a block diagram of transmitter 1200 where the geographic location information 1236 is received through a secondary radio 1306. The receiver in the secondary radio receives location information from one or more base stations and/or base station controllers (not shown) of a wireless communication system that is different from the wireless communication system with which the transmitter 1200 is communicating. The location information 1236 received by the controller 1234 is processed to determine the service region in which the transmitter 1200 is located.

Figure 13D:
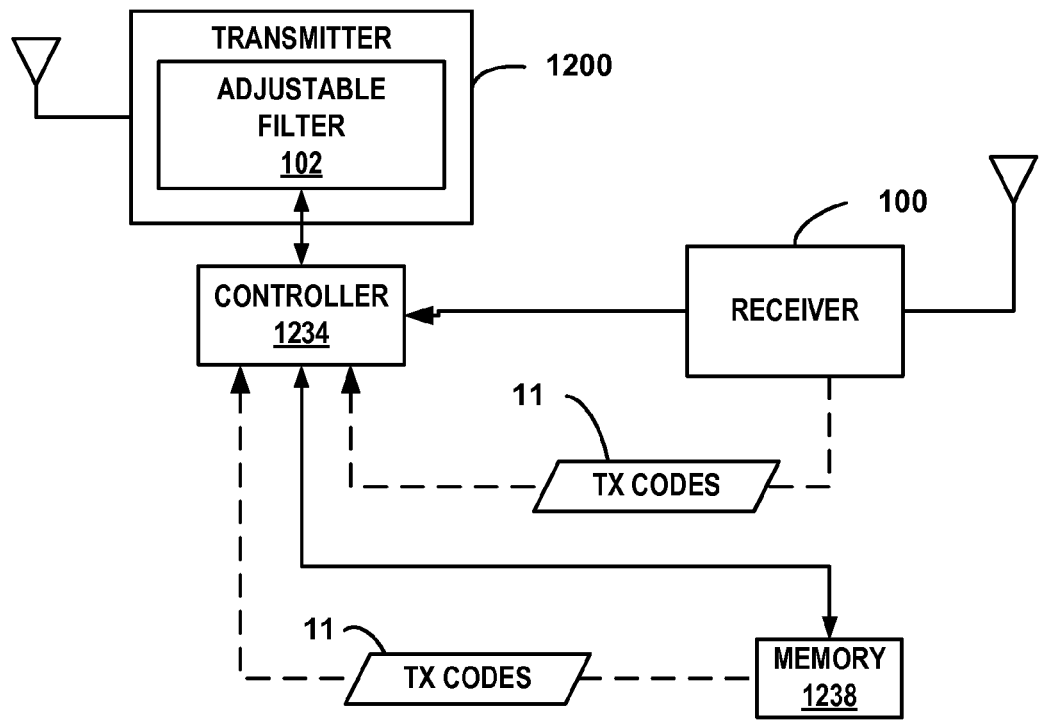
FIG. 13D is a block diagram of the transmitter 1200 where the controller 1234 adjusts the filter 102 based on transmission codes 11.

FIG. 13D is a block diagram of the transmitter 1200 where the controller 1234 adjusts the filter 102 based on transmission codes 11. The transmission codes may be assigned prior to operation and stored in memory 1238 or may be assigned dynamically by the network. Further the transmission codes 11 may be assigned by the network and subsequently stored in memory 1238 for later retrieval. The dashed lines in FIG. 13D indicate that the transmission codes may be received through any of numerous sources or combination of sources depending on the particular situation and implementation. The controller 1234 may adjust the filter 102 at least partially based on the transmission codes 11. In some circumstances, the assigned transmission codes may indicate the geographic location of the device including the transmitter 1200 since a particular transmission code may only be assigned in a particular region. Accordingly, the transmission codes 11 may be location information 132 in some situations. The controller 1234 may adjust the filter 102 based on a combination of transmission code 11 information, location information and/or spectral conditions. An example of a filter adjustment based on transmission codes 11 includes a situation where less than all of the channels within a band group are assigned for transmission by the transmission codes 11, the controller 1234 adjusts the center frequency and/or bandwidth to maximize efficiency and minimize noise for the particular channel allocation.

Figure 14:
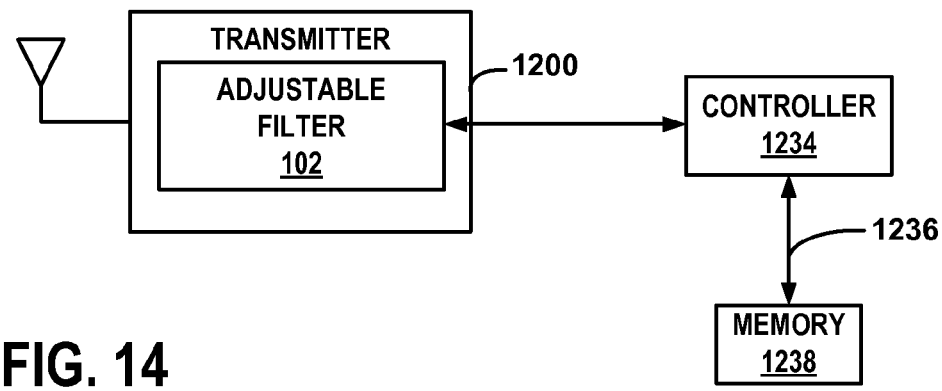
FIG. 14 is a block diagram of transmitter where the geographic location information is programmed into memory.

FIG. 14 is a block diagram of transmitter 1200 where the geographic location information is programmed into memory 1238 associated with a transmitter (e.g., base station or a mobile wireless communications device). Thus, transmitter 1200 can receive geographic location information 1236 from memory 1238. The location information 1236 received by controller 1234 from memory 1238 is processed to determine the service region in which the transmitter is located. In some circumstances, the region may be stored in the memory 1238. Further, the parameters corresponding to generating the control signal may be stored in memory where the controller may process the location information and select the stored parameters corresponding to the region or may apply the parameters without processing where the parameters only apply to the programmed region. One possible advantage of the example shown in FIG. 14 is that it may simplify initialization of a transmitter.

Figure 15A:
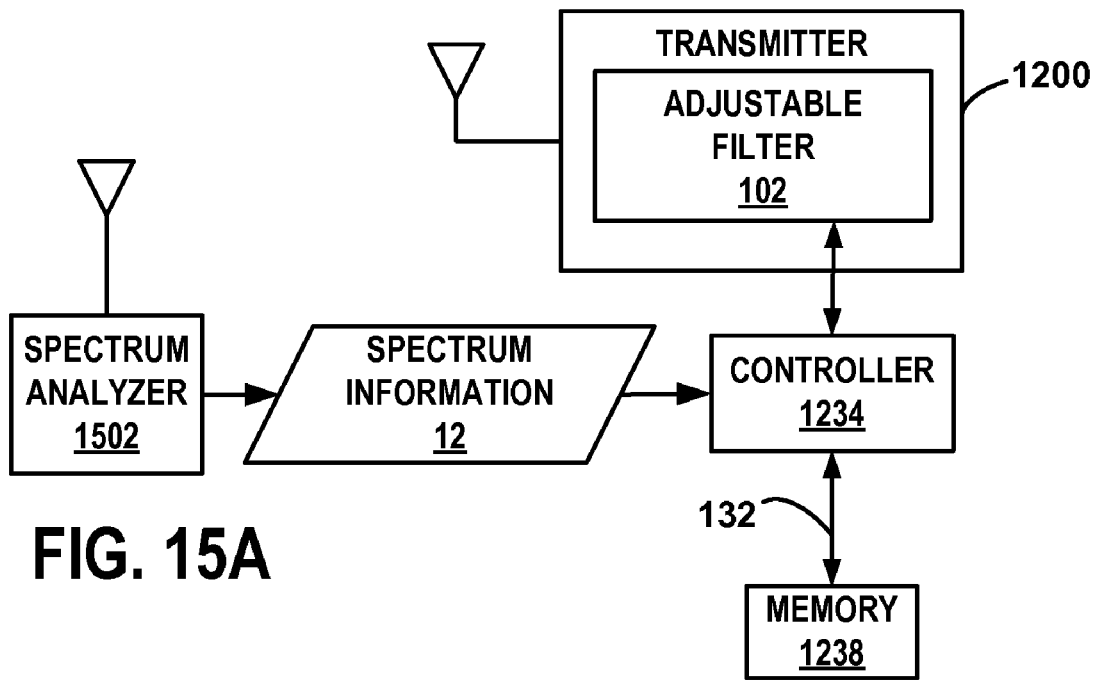
FIG. 15A is a block diagram of the transmitter where the controller adjusts the frequency response based on frequency spectrum information.

FIG. 15A is a block diagram of the transmitter 1200 where the controller 1234 adjusts the frequency response 1210 based on spectral conditions. A spectrum analyzer 1502 provides information 20 regarding the frequency spectrum. The spectrum analyzer 1502 is any combination of hardware, software and/or firmware that provides information regarding transmitted signals with in a selected frequency band. Examples of the spectrum analyzer include energy detectors, power detectors, and signal detectors. Implementations of the spectrum analyzer 1502 include a receiver connected to a processor where the processor determines that transmitted energy is present at a particular frequency or within a particular frequency band. Accordingly, a processor may integrate over a frequency band and process the data to determine whether a transmitted signal is present. At least portions of the controller 1234 and a receiver within the device housing the transmitter 1200 may be used to implement the spectrum analyzer 1502 in some situations.

The controller 1234 evaluates the spectrum information 20 to determine an appropriate frequency response for the adjustable filter based on the signals that are detected. Interference to nearby devices may be reduced by increasing attenuation of the adjustable filter at frequencies near the frequency of the detected signals. In some circumstances, characteristics of the detected signals, such as frequency and modulation, may indicate the type of device that is transmitting the signal and the controller may adjust the filter based on an anticipated signal that is not yet detected but anticipated based on the identification of the interfering device. Further, characteristics of the detected signal may indicate a geographical region and the controller may adjust the filter based on the identified geographical region. Accordingly, spectrum analysis may reveal information that indirectly results in the adjustment of the filter. In addition, the controller may adjust the level of attenuation of the frequency response based on an energy, power, or amplitude of the detected signal.

In some circumstances, the bandwidth of the filter may be increased or the attenuation of the step band decreased based on the spectrum analysis. For example, if no signals, or very few low level signals, are detected near the transmission frequency, the controller 1234 may reduce rejection in order to increase the amplitude of the transmitted signal.

The adjustment to the frequency response may be variable based on a calculated value or may be one of a limited number of predetermined responses. Where a calculation is performed, the control signals are based on calculated values and may be any of numerous values and combinations to set the bandwidth, center frequency or other characteristics. Where a response is selected from a set of frequency responses, the spectrum analysis indicates a circumstance that dictates a particular preferred frequency response that can be selected from a table or other correlation technique. For example, if a detected signal indicates that nearby devices are engaging in Bluetooth radio communications, a frequency response designed to minimize all or most interference to Bluetooth communications is employed by providing control signals in accordance with stored parameters corresponding to the frequency response.

Figure 15B:
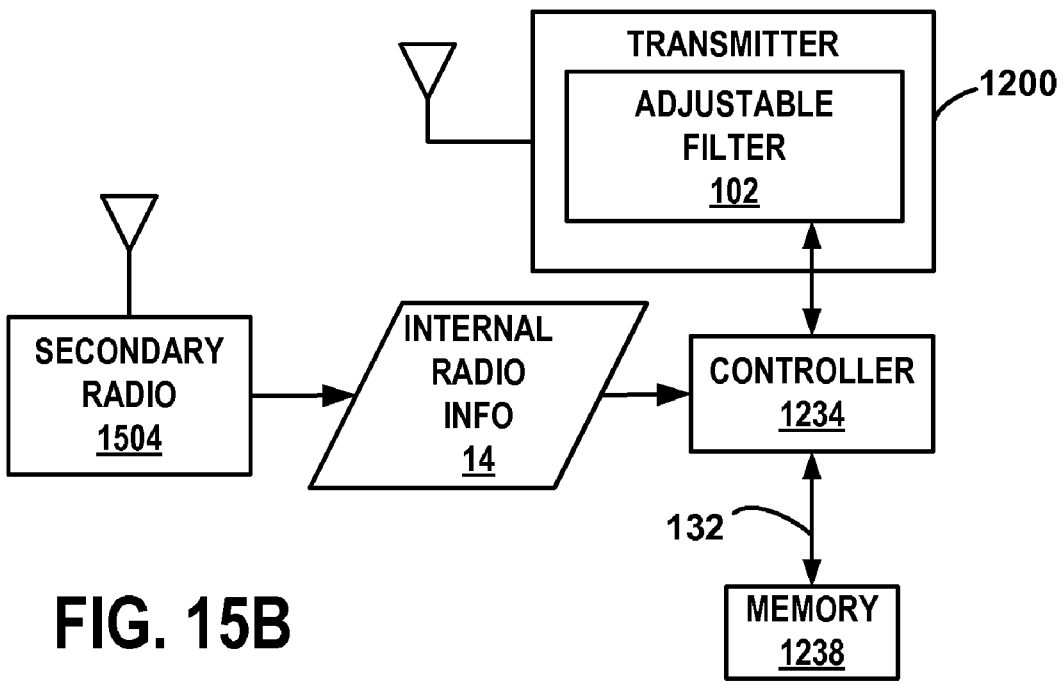
FIG. 15B is a block diagram of the transmitter where the controller adjusts the frequency response based on a status of an internal radio (secondary radio) within the device housing the transmitter.

FIG. 15B is a block diagram of the transmitter 1200 where the controller 1234 adjusts the frequency response based on a status of an internal radio (secondary radio) 1504 within the device housing the transmitter 1200. Therefore, the device that includes the transmitter 1200 is a dual mode communication device or a multimode communication device that is capable of receiving signals within at least two frequency bands. FIG. 15B illustrates a single secondary radio 1504. The communication device within which the transmitter 1200 is implemented, however, may include more than one additional internal radio 1504. Further, the secondary radio 1504 may be capable of operating within more than one frequency band.

The secondary radio 1504 provides information 30 regarding the status of the radio 1504. The status may include one or more of the following parameters as well as others: on/off status (whether the radio is activated and operating), transmission status (whether the radio is transmitting), receive status (whether the radio is receiving signals), transmission frequency status (frequencies or frequency band of transmitted signals), receive frequency status (frequencies or frequency band of received signals), modulation status (type of modulation used for transmitted signals), and signal power status (power level of transmitted signals). The controller 1234 processes the information 30 and selects an appropriate frequency response based on information to minimize interference with the signals received by the secondary internal radio 1504. The selection of the frequency response may be based on any of numerous calculations or factors. Some examples include narrowing the pass band and/or shifting the center frequency to minimize interference to the secondary radio received signals that are near the transmission band of the transmitter, narrowing the pass band and/or shifting the center frequency to minimize interference from spurious emissions and intermodulation components caused by the transmitter 1200, and widening the pass band and/or shifting the center frequency to increase signal-to-noise ratio when the secondary radio is inactive or not receiving signals. Further, where the adjustable filter is within an inter-stage of the transmitter rather than the front end, the frequency response may be adjusted to avoid intermodulation distortion of signal components leaking into the transmitter 1200 from the secondary radio 1504.

Figure 16:
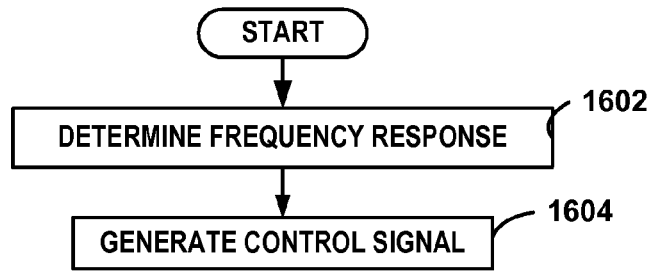
FIG. 16 is a flow chart of a method of establishing a frequency response of an adjustable filter with a control signal.

FIG. 16 is a flow chart of a method of establishing a frequency response of an adjustable filter with a control signal. At step 1602, a desired frequency response of an adjustable filter (e.g., an adjustable receive band filter or an adjustable transmit band filter) is established for a receiver or a transmitter. The desired frequency response may be, for example, based on a geographic location of a receiver or a transmitter, a region in which a receiver or transmitter is located or expected to be located (e.g., a region frequency response), a detected signal/interference (e.g., an environmental frequency response), and/or a determination of a number of radios that are operational within a device (e.g., an operational frequency response).

At step 1602, a control signal is generated in order to establish the desired frequency response. In one aspect, the control signal may be generated by a controller.

Figure 17:
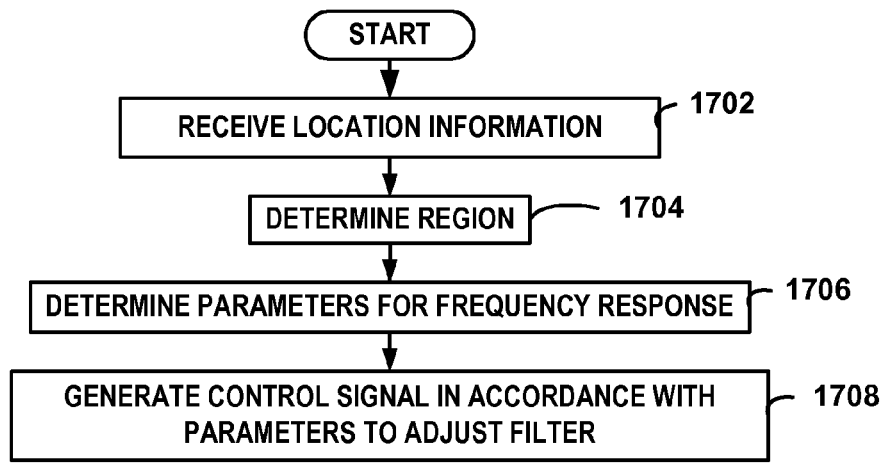
FIG. 17 is a flow chart of a method of adjusting a filter based on location information.

FIG. 17 is a flow chart of a method of adjusting a filter based on location information. The method may be performed by any combination of hardware, software and/or firmware. For example, the method is at least partially performed by executing code on a controller 130, 1238.

At step 1702, location information is received. The location information may be provided by a GPS receiver, received from a base station, retrieved from memory, or determined by evaluating a spectral analysis of a frequency spectrum.

At step 1704, the geographical region is determined based on the location information. The controller determines a geographical region of the location by comparing the location information to stored data.

At step 1706, parameters for generating an appropriate control signal are determined from the region. The desired frequency response of the adjustable filter is determined based on the region and the parameters corresponding to the frequency response are determined. An example of a suitable technique for determining the control signal includes retrieving parameters stored in memory and correlated to the region. For example, a stored table in memory may provide a parameter or set of parameters corresponding to each region.

At step 1708, a control signal is generated based on the parameters. The parameters may indicate a code, amplitude, frequency, voltage, bit stream or any other data that allows the controller to generate the control signal to adjust the filter 102.

Figure 18:
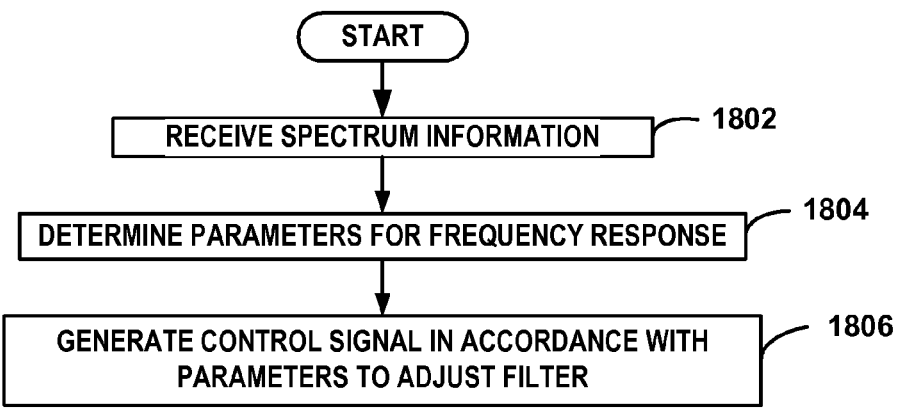
FIG. 18 is a flow chart of a method of adjusting a filter based on spectrum information.

FIG. 18 is a flow chart of a method of adjusting a filter based on spectrum information. The method may be performed by any combination of hardware, software and/or firmware. For the example, the method is at least partially performed by executing code on a controller 130, 1238.

At step 1802, spectrum information 20 is received. The spectrum information 20 is provided by a spectrum analyzer in the example. The spectrum information may identify particular frequencies or frequency bands where signals had been detected, energy levels of detected signals noise levels, or any other characteristic describing the frequency spectrum.

At step 1804, parameters for generating an appropriate control signal are determined from the spectrum information 20. The desired frequency response of the adjustable filter is determined based on the potential for interference and the parameters corresponding to the frequency response are determined. In some circumstances, the controller determines the region of operation based on the spectrum analysis and the region is used to determine the parameters as discussed above.

At step 1806, a control signal is generated based on the parameters. The parameters may indicate a code, amplitude, frequency, voltage, bit stream or any other data that allows the controller to generate the control signal to adjust the filter 102 in accordance with the desired frequency response.

Figure 19:
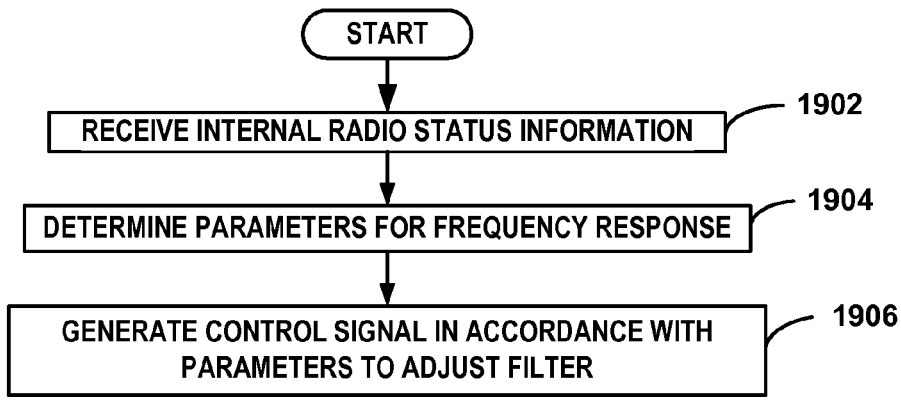
FIG. 19 is a flow chart of a method of adjusting a filter based on secondary radio status.

FIG. 19 is a flow chart of a method of adjusting a filter based on secondary radio status. The method may be performed by any combination of hardware, software and/or firmware. For the example, the method is at least partially performed by executing code on a controller 130, 1238.

At step 1902, radio status information 30 is determined by the controller. The controller determines from received information or from measured values, the status of the secondary radio within the device. Accordingly, the controller determines characteristics regarding the secondary radio current state and operation such as whether the secondary radio is transmitting or receiving signals, is active, and what frequencies are being used by the radio. As discussed above, other characteristics may be evaluated or determined.

At step 1904, parameters for generating an appropriate control signal are determined from the radio status information 30. The desired frequency response of the adjustable filter is determined based on the potential for interference and the parameters corresponding to the frequency response are determined.

At step 1906, a control signal is generated based on the parameters. The parameters may indicate a code, amplitude, frequency, voltage, bit stream or any other data that allows the controller to generate the control signal to adjust the filter 102 in accordance with the desired frequency response.

Figure 20:
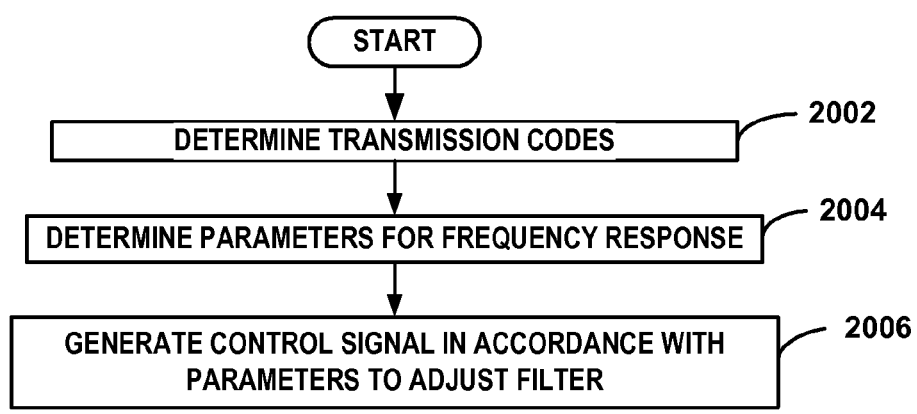
FIG. 20 is a flow chart of a method of adjusting filter based on transmission codes.

FIG. 20 is a flow chart of a method of adjusting the filter 102 based on transmission codes 11. The method may be performed by any combination of hardware, software and/or firmware. For the example, the method is at least partially performed by executing code on a controller 130, 1238.

At step 2002, the controller 130, 1238 determines the transmission codes. The transmission codes are stored in memory and may have been assigned and stored prior to operation or may have been dynamically assigned by the network and stored. As explained above, the transmission codes may be received through any of numerous sources or combination of sources depending on the particular situation and implementation.

At step 2004, the controller determines the filter parameters that correspond to the assigned transmission codes. The determination may be based solely on the transmission codes or may be based on a variety of factors and weighting schemes depending on the particular implementation. In some circumstances, the assigned transmission codes may indicate the geographic location of the device since a particular transmission code may only be assigned in particular regions. Accordingly, the transmission codes 11 may be location information 132 in some situations. The controller 134 may determine the filter parameters based on a combination of transmission code 11 information, location information and/or radio activity information. An example of a determination of filter parameters based on transmission codes 11 includes a situation where less than all of the channels within a band group are assigned by the transmission codes 11, the controller 134 adjusts the center frequency and/or bandwidth to maximize efficiency and minimize noise for the particular channel allocation.

At step 2006, the controller generates control signals to adjust the filter. The control signals adjust the filter to configure the filter to have the desired filter parameters determined.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless transmitter comprising:
   an adjustable transmission band filter responsive to a control signal to establish a frequency response of the adjustable transmission band filter, wherein the frequency response comprises a pass band and a stop band for attenuating an undesired signal having a frequency within the stop band more than a desired signal having a frequency within the pass band, the adjustable transmission band filter being responsive to the control signal to select the frequency response from a first frequency response having a center of the pass band at a first center frequency and a second frequency response having a center of the pass band at a second center frequency; and
   a controller configured to evaluate both a geographic location of the wireless transmitter and a status of a secondary internal radio within the wireless transmitter and to generate the control signal, wherein the controller determines the control signal to generate based on the evaluation of both the status of the secondary internal radio within the wireless transmitter and the geographic location of the wireless transmitter.

2. The wireless transmitter of claim 1, wherein the first frequency response has a first bandwidth and the second frequency response has a second bandwidth.

3. The wireless transmitter of claim 2, wherein the adjustable transmission band filter is responsive to the control signal to select the frequency response based on a geographic location of the wireless transmitter, the adjustable transmission band filter selecting from a plurality of region frequency responses comprising:
   a first region frequency response having a first region pass band including a first band group of a plurality of channel bands, and
   a second region frequency response having a second region pass band including a second band group of a plurality of channel bands, the first band group including at least one channel band not included in the second band group.

4. The wireless transmitter of claim 3, wherein the plurality of channel bands are defined by an Ultra-wideband (UWB) communication standard.

5. The wireless transmitter of claim 3, wherein the adjustable transmission band filter is further responsive to the control signal to select the frequency response based on an assigned transmission code indicating at least one assigned channel band.

6. The wireless transmitter of claim 1, wherein the status of the secondary internal radio comprises one of:
   on/off status;
   receive status;
   transmission frequency status;
   receive frequency status;
   modulation status; and
   signal power status.

7. The wireless transmitter of claim 1, wherein the adjustable transmission band filter is further responsive to the control signal to select a frequency response based on detected interference.

8. The wireless transmitter of claim 2, wherein the adjustable transmission band filter is responsive to the control signal to select the frequency response from a plurality of frequency responses associated with the status comprising:
   a first status frequency response having a first status pass band including a first band group of a plurality of channel bands, and
   a second status frequency response having a second status pass band including a second band group of a plurality of channel bands, the first band group including at least one channel band not included in the second band group.

9. The wireless transmitter of claim 2, wherein the first bandwidth is the same as the second bandwidth, and wherein the first center frequency is different from the second center frequency.

10. The wireless transmitter of claim 2, wherein the first bandwidth is different from the second bandwidth, and wherein the first center frequency is the same as the second center frequency.

11. A method, comprising:
    establishing, with a control signal, a frequency response of an adjustable transmission band filter in a wireless transmitter, wherein establishing the frequency response comprises:
    attenuating an undesired signal having a frequency within a stop band more than a desired signal having a frequency within a pass band; and selecting the frequency response from a first frequency response having a center of the pass band at a first center frequency and a second frequency response having a center of the pass band at a second center frequency; and generating, with a controller, the control signal, wherein the controller determines the control signal to generate based on the evaluation of both the status of the secondary internal radio within the wireless transmitter and the geographic location of the wireless transmitter.

12. The method of claim 11, wherein the first frequency response has a first bandwidth and the second frequency response has a second bandwidth.

13. The method of claim 12, wherein the adjustable transmission band filter is responsive to the control signal to select the frequency response based on a geographic location of the wireless transmitter, the adjustable transmission band filter selecting from a plurality of region frequency responses comprising:
   a first region frequency response having a first region pass band including a first band group of a plurality of channel bands, and
   a second region frequency response having a second region pass band including a second band group of a plurality of channel bands, the first band group including at least one channel band not included in the second band group.

14. The method of claim 13, wherein the plurality of channel bands are defined by an Ultra-wideband (UWB) communication standard.

15. The method of claim 13, wherein the adjustable transmission band filter is further responsive to the control signal to select the frequency response based on an assigned transmission code indicating at least one assigned channel band.

16. The method of claim 11, wherein the status of the secondary internal radio comprises one of:
   on/off status;
   receive status;
   transmission frequency status;
   receive frequency status;
   modulation status; and
   signal power status.

17. The method of claim 13, wherein the adjustable transmission band filter is responsive to the control signal to select the frequency response from a plurality of frequency responses associated with the status comprising:
   a first status frequency response having a first status pass band including a first band group of a plurality of channel bands, and
   a second status frequency response having a second status pass band including a second band group of a plurality of channel bands, the first band group including at least one channel band not included in the second band group.

18. The method of claim 12, wherein the first bandwidth is the same as the second bandwidth, and wherein the first center frequency is different from the second center frequency.

19. The method of claim 12, wherein the first bandwidth is different from the second bandwidth, and wherein the first center frequency is the same as the second center frequency.

20. A computer program product having a non-transitory computer-readable medium with instructions recorded thereon, the instructions comprising:
   code for establishing, with a control signal, a frequency response of an adjustable transmission band filter in a wireless transmitter, wherein the code for establishing the frequency response comprises:
      code for attenuating an undesired signal having a frequency within a stop band more than a desired signal having a frequency within a pass band; and
      code for selecting the frequency response from a first frequency response having a center of the pass band at a first center frequency and a second frequency response having a center of the pass band at a second center frequency;
   code for evaluating both a geographic location of the wireless transmitter and a status of a secondary internal radio within the wireless transmitter; and
   code for generating, with a controller, wherein the controller determines the control signal to generate the control signal based on the evaluation of both the status of the secondary internal radio within the wireless transmitter and the geographic location of the wireless transmitter.

21. The computer program product of claim 20, wherein the first frequency response has a first bandwidth and the second frequency response has a second bandwidth.

22. The computer program product of claim 21, wherein the adjustable transmission band filter is responsive to the control signal to select the frequency response based on a geographic location of the wireless transmitter, the adjustable transmission band filter selecting from a plurality of region frequency responses comprising:
   a first region frequency response having a first region pass band including a first band group of a plurality of channel bands, and
   a second region frequency response having a second region pass band including a second band group of a plurality of channel bands, the first band group including at least one channel band not included in the second band group.

23. The computer program product of claim 22, wherein the plurality of channel bands are defined by an Ultra-wideband (UWB) communication standard.

24. The computer program product of claim 22, wherein the adjustable transmission band filter is further responsive to the control signal to select the frequency response based on an assigned transmission code indicating at least one assigned channel band.

25. The computer program product of claim 20, wherein the status of the secondary internal radio comprises one of:
   on/off status;
   receive status;
   transmission frequency status;
   receive frequency status;
   modulation status; and
   signal power status.

26. The computer program product of claim 21, wherein the adjustable transmission band filter is responsive to the control signal to select the frequency response from a plurality of frequency responses associated with the status comprising:
   a first status frequency response having a first status pass band including a first band group of a plurality of channel bands, and
   a second status frequency response having a second status pass band including a second band group of a plurality of channel bands, the first band group including at least one channel band not included in the second band group.

27. The computer program product of claim 21, wherein the first bandwidth is the same as the second bandwidth, and wherein the first center frequency is different from the second center frequency.

28. The computer program product of claim 21, wherein the first bandwidth is different from the second bandwidth, and wherein the first center frequency is the same as the second center frequency.

29. A wireless transmitter comprising:
an adjustable transmission band filter means responsive to a control signal to establish a frequency response of the adjustable transmission band filter, wherein the frequency response comprises a pass band and a stop band for attenuating an undesired signal having a frequency within the stop band more than a desired signal having a frequency within the pass band, the adjustable receive band filter means responsive to the control signal to select the frequency response from a first frequency response having a center of the pass band at a first center frequency and a second frequency response having a center of the pass band at a second center frequency; and
a controller means configured to generate the control signal wherein the controller determines the control signal to generate based on the evaluation of both the the status of the secondary internal radio within the wireless transmitter and the geographic location of the wireless transmitter.

30. The wireless transmitter of claim 29, wherein the first frequency response has a first bandwidth and the second frequency response has a second bandwidth.

31. The wireless transmitter of claim 30, wherein the adjustable transmitter band filter means is responsive to the control signal to select the frequency response based on a geographic location of the wireless transmitter, the adjustable transmission band filter selecting from a plurality of region frequency responses comprising:
a first region frequency response having a first region pass band including a first band group of a plurality of channel bands, and
a second region frequency response having a second region pass band including a second band group of a plurality of channel bands, the first band group including at least one channel band not included in the second band group.

32. The wireless transmitter of claim 31, wherein the plurality of channel bands are defined by an Ultra-wideband (UWB) communication standard.

33. The wireless transmitter of claim 31, wherein the adjustable receive band filter means is further responsive to the control signal to select the frequency response based on an assigned transmission code indicating at least one assigned channel band.

34. The wireless transmitter of claim 29, wherein the status of the secondary internal radio comprises one of:
on/off status;
receive status;
transmission frequency status;
receive frequency status;
modulation status; and
signal power status.

35. The wireless transmitter of claim 29, wherein the adjustable receive band filter means is further responsive to the control signal to select a frequency response based on detected interference.

36. The wireless transmitter of claim 30, wherein the adjustable transmission band filter means is responsive to the control signal to select the frequency response from a plurality of frequency responses associated with the status comprising:
a first status frequency response having a first status pass band including a first band group of a plurality of channel bands, and
a second status frequency response having a second status pass band including a second band group of a plurality of channel bands, the first band group including at least one channel band not included in the second band group.

37. The wireless transmitter of claim 30, wherein the first bandwidth is the same as the second bandwidth, and wherein the first center frequency is different from the second center frequency.

38. The wireless transmitter of claim 30, wherein the first bandwidth is different from the second bandwidth, and wherein the first center frequency is the same as the second center frequency.

* * * * *

UNITED STATES PATENT AND TRADEMARK OFFICE
CERTIFICATE OF CORRECTION

PATENT NO. : 8,204,444 B2  Page 1 of 1
APPLICATION NO. : 12/365477
DATED : June 19, 2012
INVENTOR(S) : Amol Rajkotia, Samir S Soliman and Stanley S. Toncich It is certified that error appears in the above-identified patent and that said Letters Patent is hereby corrected as shown below:

Title Page, Item (54) and at Column 1, lines 1 and 2,

Title is listed as: Adjustable Transmission Filter Responsive to Internal SADIO Status Title Should Read: Adjustable Transmission Filter Responsive to Internal RADIO Status Signed and Sealed this
Twentieth Day of November, 2012

David J. Kappos
*Director of the United States Patent and Trademark Office*